US008503003B2

(12) United States Patent
Kurahashi

(10) Patent No.: US 8,503,003 B2
(45) Date of Patent: Aug. 6, 2013

(54) ERROR NOTIFICATION METHOD AND APPARATUS

(75) Inventor: Masahiro Kurahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1169 days.

(21) Appl. No.: 12/405,916

(22) Filed: Mar. 17, 2009

(65) Prior Publication Data

US 2009/0237741 A1 Sep. 24, 2009

(30) Foreign Application Priority Data

Mar. 18, 2008 (JP) ................................ 2008-069969

(51) Int. Cl.
*G06K 15/00* (2006.01)

(52) U.S. Cl.
USPC ........................................ 358/1.14; 358/406

(58) Field of Classification Search
USPC ...................................... 358/406, 1.14, 1.15
See application file for complete search history.

(56) References Cited

U.S. PATENT DOCUMENTS

| | | | | |
|---|---|---|---|---|
| 5,047,977 | A * | 9/1991 | Hill et al. | 714/57 |
| 5,620,264 | A * | 4/1997 | Kagita | 400/74 |
| 7,149,936 | B2 * | 12/2006 | Deshpande et al. | 714/57 |
| 2004/0156064 | A1 * | 8/2004 | Owen et al. | 358/1.13 |
| 2004/0260704 | A1 * | 12/2004 | Moore | 707/100 |

FOREIGN PATENT DOCUMENTS

| | | | |
|---|---|---|---|
| JP | 08-037588 | A | 2/1996 |
| JP | 8-37588 | A | 2/1996 |
| JP | 10-173848 | A | 6/1998 |
| JP | 2002-262010 | A | 9/2002 |
| JP | 2004-135033 | A | 4/2004 |
| JP | 2007-041840 | A | 2/2007 |

* cited by examiner

*Primary Examiner* — Eric A Rust

(74) *Attorney, Agent, or Firm* — Canon U.S.A., Inc., IP Division

(57) ABSTRACT

An image forming apparatus includes a determination unit configured to determine an abnormal state of the image forming apparatus, a storage unit configured to store information indicating a state of the image forming apparatus, and a plurality of output units configured to output the stored information by different output methods. The image forming apparatus also includes a display unit configured to display information regarding each of the plurality of output units, and a selection unit configured to select an output unit designated by a user using the displayed information. The image forming apparatus outputs the stored information using the selected output unit.

16 Claims, 20 Drawing Sheets

```
USB MEMORY SELECTED AS NOTIFICATION DEVICE
(OUTPUT LEVEL 1) OCCURRENCE OF JAM > 5 (FLAG 1)
```

- BASIC INFORMATION: DATE AND TIME, SOFTWARE VERSION, APPARATUS CONFIGURATION
- JAM HISTORY: PAPER FEEDER, PAPER SIZE, WHERE PAPER IS JAMMED, COUNTER VALUE, MODE (TWO-SIDED OR ADF)
- ERROR HISTORY: ERROR TYPE, OCCURRENCE FREQUENCY
- LOG DATA
- REPAIR HISTORY, REPAIR REQUEST HISTORY

FIG. 10

VERSION INFORMATION (1/2)

| | |
|---|---|
| CONT | 5.01 |
| DCON | 2.01 |
| PANEL | 10.01 |
| FEEDER | 1.01 |
| SORTER | 1.01 |
| DECK | 1.01 |
| NETWORK | --- |

FIG. 11

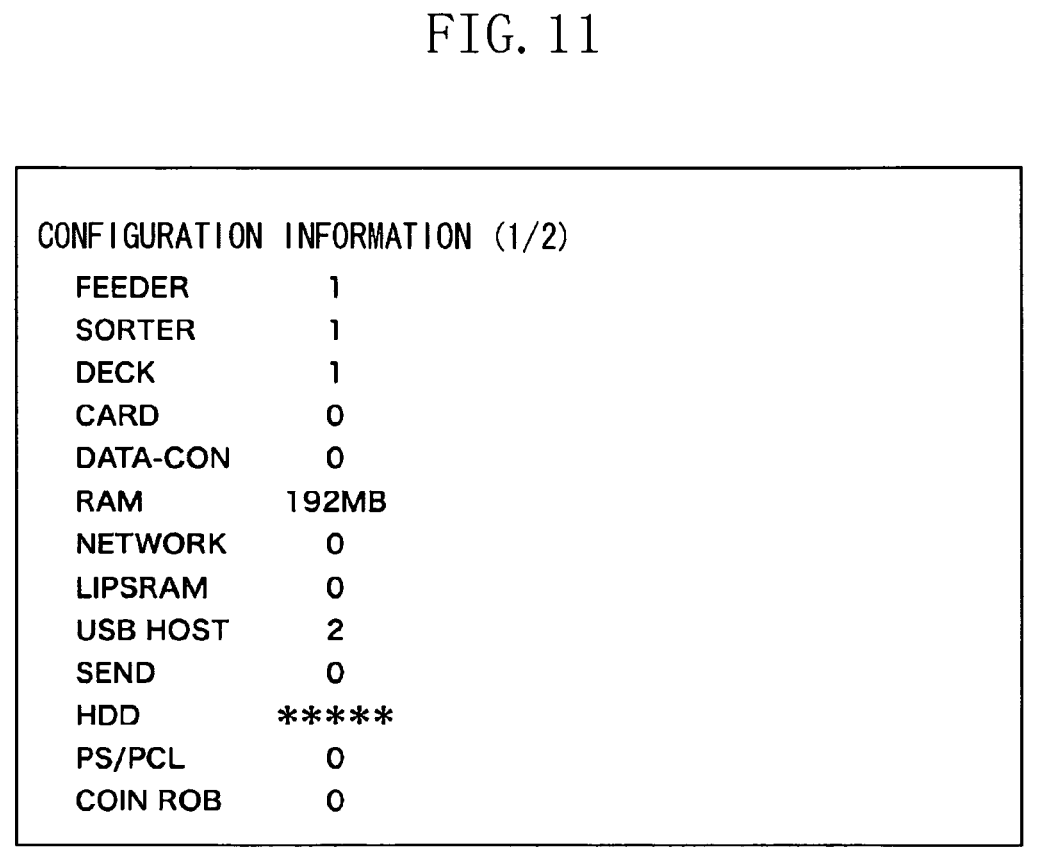

CONFIGURATION INFORMATION (1/2)

| | |
|---|---|
| FEEDER | 1 |
| SORTER | 1 |
| DECK | 1 |
| CARD | 0 |
| DATA-CON | 0 |
| RAM | 192MB |
| NETWORK | 0 |
| LIPSRAM | 0 |
| USB HOST | 2 |
| SEND | 0 |
| HDD | ***** |
| PS/PCL | 0 |
| COIN ROB | 0 |

FIG. 12

JAM INFORMATION (1/2)

| | | | | | |
|---|---|---|---|---|---|
| 01 | 0611 | 0831 | ***1 | 154578 | ABC |
| 02 | 0611 | 0830 | ***1 | 154576 | ABC |
| 03 | 0611 | 0828 | ***1 | 154574 | ABC |
| 04 | -- | -- | -- | -- | -- |
| 05 | -- | -- | -- | -- | -- |
| 06 | -- | -- | -- | -- | -- |
| 07 | -- | -- | -- | -- | -- |

FIG. 13

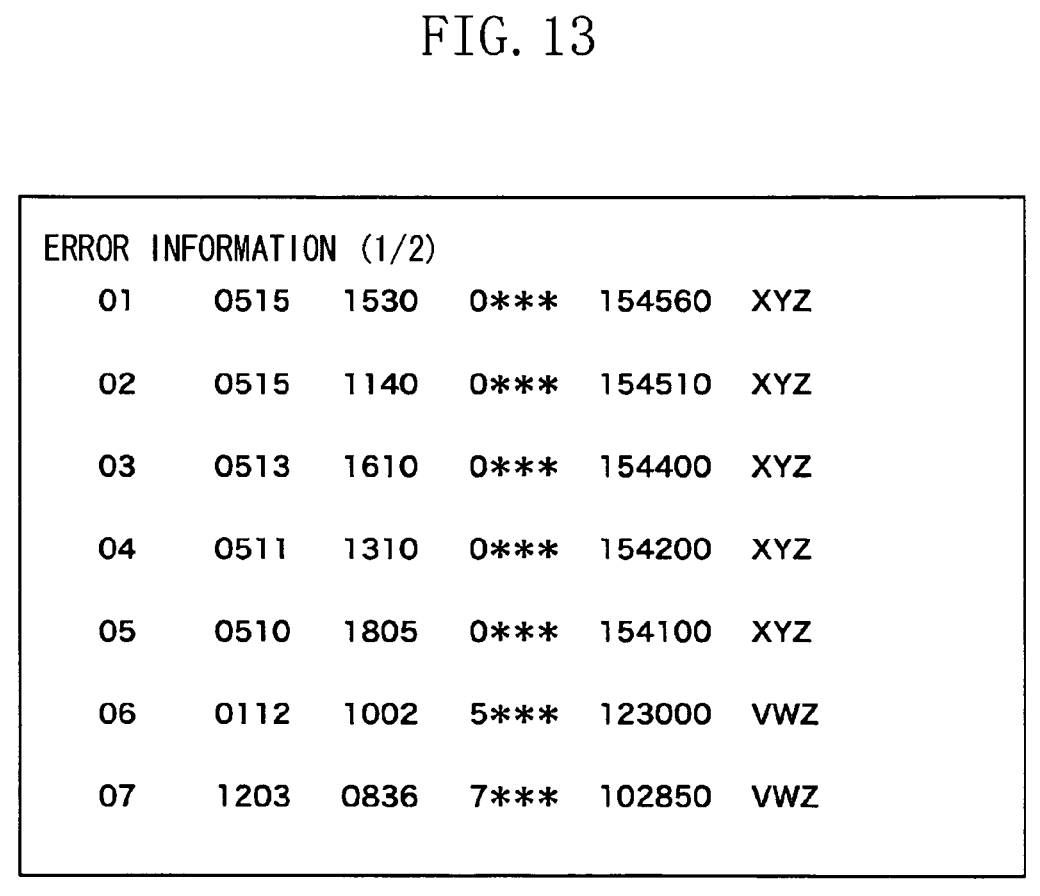

ERROR INFORMATION (1/2)

| | | | | | |
|---|---|---|---|---|---|
| 01 | 0515 | 1530 | 0*** | 154560 | XYZ |
| 02 | 0515 | 1140 | 0*** | 154510 | XYZ |
| 03 | 0513 | 1610 | 0*** | 154400 | XYZ |
| 04 | 0511 | 1310 | 0*** | 154200 | XYZ |
| 05 | 0510 | 1805 | 0*** | 154100 | XYZ |
| 06 | 0112 | 1002 | 5*** | 123000 | VWZ |
| 07 | 1203 | 0836 | 7*** | 102850 | VWZ |

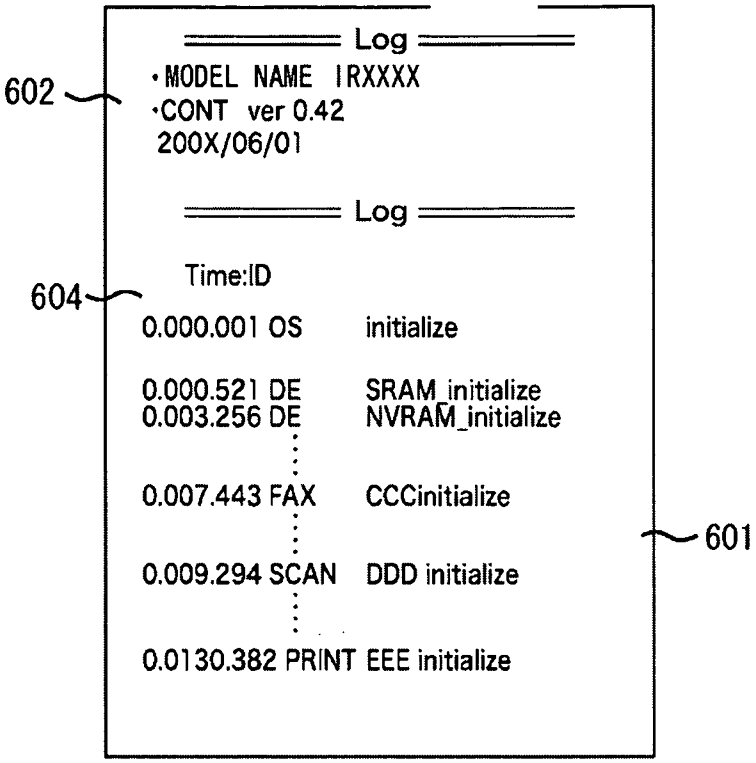

FIG. 14A

```
======== Log ========
• MODEL NAME IRXXXX
• CONT ver 0.42
  200X/06/01

======== Log ========

Time:ID

0.000.001 OS       initialize

0.000.521 DE       SRAM_initialize
0.003.256 DE       NVRAM_initialize
        ⋮
0.007.443 FAX      CCCinitialize

0.009.294 SCAN     DDD initialize
        ⋮
0.0130.382 PRINT EEE initialize
```

- 602 → header block
- 604 → Time:ID
- 601 → overall log

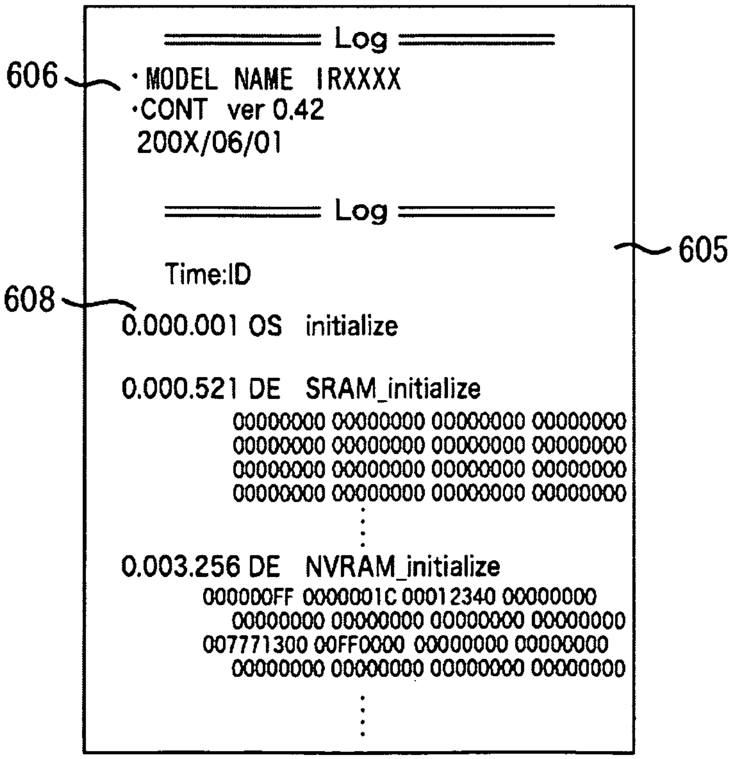

FIG. 14B

```
======== Log ========
• MODEL NAME IRXXXX
• CONT ver 0.42
  200X/06/01

======== Log ========

Time:ID

0.000.001 OS    initialize

0.000.521 DE    SRAM_initialize
          00000000 00000000 00000000 00000000
          00000000 00000000 00000000 00000000
          00000000 00000000 00000000 00000000
          00000000 00000000 00000000 00000000
                    ⋮
0.003.256 DE    NVRAM_initialize
          000000FF 0000001C 00012340 00000000
          00000000 00000000 00000000 00000000
          007771300 00FF0000 00000000 00000000
          00000000 00000000 00000000 00000000
                    ⋮
```

- 606 → header
- 608 → Time:ID
- 605 → overall log

```
ERROR REPORT

PLEASE SCAN THE DATA BELOW USING
A SCANNER AND SEND THE SCANNED DATA
TO THE SERVICE CENTER,
   ADDRESS:*****@**.CO.JP

********
<CONFIGURATION
       INFORMATION> ********
<ERROR INFORMATION>********
<VERSION INFORMATION>********
<LOG INFORMATION>  ********
```

```
TELEPHONE INFORMATION
                                           CONTACT
PLEASE CALL THE CONTACT PERSON ON         ○○△△SALES COMPANY
THE RIGHT AND SE ND ERROR INFORMATION.    FIRST SALES DIVISION
                                                 YAMADA
MODEL: IRXXXX FIXING ERROR                TEL 03-*-**
ERROR CODE : E*-**
CONFIGURATION: STANDALONE IRXXXX
      ADF-1
      SORT Z

<REMARKS>
PLEASE DESCRIBE THE OCCURRENCE OF THE ERROR IN DETAIL.
PLEASE TURN OFF THE POWER OF THE APPARATUS.
```

ERROR NOTIFICATION METHOD AND APPARATUS

BACKGROUND OF THE INVENTION

1. Field of the Invention

The present invention generally relates to an image forming apparatus configured to form an image, a maintenance management method, and a storage medium for storing a program thereof.

2. Description of the Related Art

Conventionally, users of image forming apparatuses call service centers by telephone if an abnormal state of image forming apparatuses occurs, or if the users find something unusual about the apparatuses, such as an unusual noise, a strange odor, a paper jam, or an image defect. Further, the users may make service calls when consumables of the apparatuses run out. Status of the apparatuses is typically explained to the service center by the users by telephone. Then, service engineers may come to installation sites and confirm the status of the apparatuses.

In such cases, notifying information (e.g., apparatus type, identification number, outline of the state, or occurrence time) of the apparatuses on the phone can be an annoyance for the users. Further, it can be difficult for a user other than an administrator of the apparatus to accurately explain the abnormal state.

Additionally, if there is no accurate information, a service engineer may go to the installation site to confirm the state of the apparatus. If a repair part or a replacement part is necessary, actual action is taken only after the service engineer returns to the service center to prepare for the part. Accordingly, service costs may increase for the service engineer's preparation of the part, and the waiting time may increase for the user to receive the part.

Japanese Patent Application Laid-Open No. 8-37588 discusses a method in which error information is automatically sent to a service center via a communication line if an image forming apparatus (e.g., online machine), which is connected to a communication line, is determined to be in an abnormal state. Further, a method for providing basic information to the service center by a user pressing a call button (e.g., service request button) has been developed. The basic information may be, for example, information on an apparatus type, an identification number, an outline of the state, and occurrence time of the error. Although detailed information is not provided to the service center, serviceability can be improved based on the provided information.

However, many image forming apparatuses that are not connected to networks or telephone lines still exist in the market. Users of such image forming apparatuses (e.g., offline machines and stand-alone machines) are unable to use automated service call or call button via the communication lines. Accordingly, the users still may be required to report the state by calling the service center.

Similarly, it can occur that the image forming apparatus is an online machine, but is not connected to a network or a telephone line (i.e., including a case of failure).

Serviceability of online machines in the market has improved due to the adoption of the above-described automated service call and the service request button. However, serviceability of offline machines remains relatively unchanged.

SUMMARY OF THE INVENTION

According to one aspect of the present invention, an image forming apparatus includes a determination unit configured to determine an abnormal state of the image forming apparatus, a storage unit configured to store information indicating a state of the image forming apparatus, and a plurality of output units configured to output the stored information in different output methods. The image forming apparatus also includes a display unit configured to display information regarding each of the plurality of output units, and a selection unit configured to select an output unit designated. The image forming apparatus outputs the stored information using the selected output unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 illustrates an example of software version information (VER information) of each unit in the image forming apparatus.

FIG. 11 illustrates an example of configuration information of units that configure the image forming apparatus.

FIG. 12 illustrates an example of paper jam information.

FIG. 13 illustrates an example of error information.

FIGS. 14A and 14B illustrate examples of log information indicating operating condition of the image forming apparatus at the time of error.

DETAILED DESCRIPTION OF THE EMBODIMENTS

Various exemplary embodiments, features, and aspects of the invention will be described in detail below with reference to the drawings.

An image forming apparatus according to an exemplary embodiment of the present invention may be used in a maintenance management system including a service center and various types of apparatuses. The image forming apparatus, the service center, and the various types of apparatuses may be connected to a network.

Figure 1:
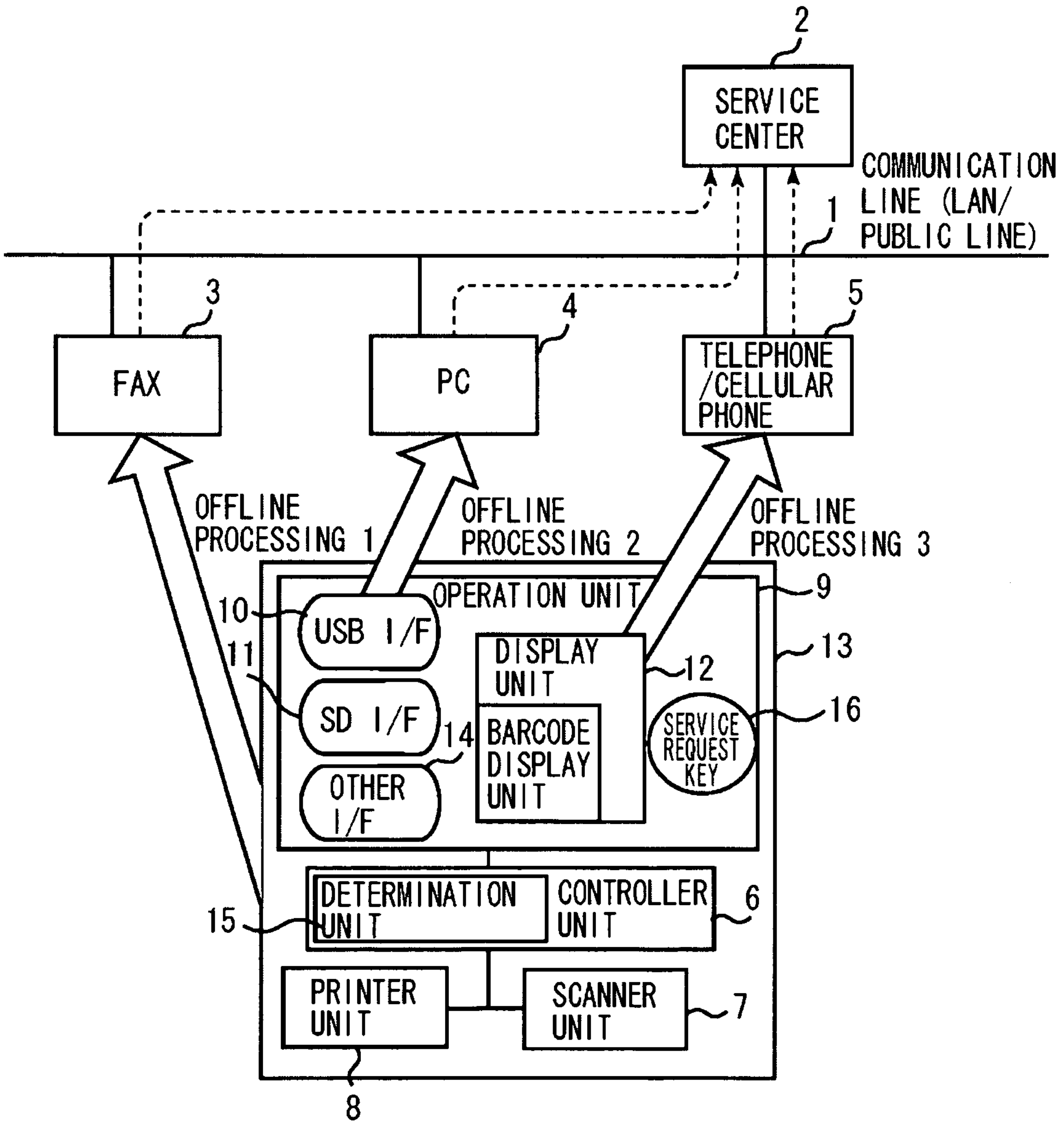
FIG. 1 illustrates an example of a configuration of a maintenance management system according to a first exemplary embodiment of the present invention.

FIG. 1 illustrates an example of a configuration of a maintenance management system according to a first exemplary embodiment of the present invention. The maintenance management system includes a service center 2, a facsimile machine (FAX) 3, a personal computer (PC) 4, and a telephone apparatus 5, all of which are connected to a communication line 1 such as a telephone line or a local area network (LAN). Additionally, the maintenance management system includes an image forming apparatus (i.e., offline machine) 13 that is not connected to the communication line 1. It is to be noted that the configuration of the maintenance management system is not limited to the above-described configuration.

The service center 2 may include a server that processes data for an external information processing apparatus. Further, an image forming apparatus, such as a multifunction peripheral, may also be connected to the communication line 1. The image forming apparatus may be capable of transmitting, for example, at least one of error and paper jam information to the server in the service center 2 using an on-line service call function. The transmitted information may be processed accordingly by the server.

According to the embodiment as shown, the facsimile machine (FAX) 3 is connected to the communication line 1 via a telephone line. The personal computer (PC) 4 is connected to the communication line 1 via a LAN. The personal computer 4 includes an interface unit such as a Universal Serial Bus (USB) interface (I/F) unit, a Secure Digital (SD) card I/F unit, or an infrared communication I/F unit. The personal computer 4 may be capable of sending data to the service center 2 via the communication line 1 using, for example, a USB memory. The telephone apparatus 5 may be, for example, an ordinary telephone that is used when the user contacts the service center 2, or a camera-equipped cellular phone that is used when the user sends a barcode to the service center.

As described above, the image forming apparatus 13 is an offline machine unconnected to the communication line 1. The image forming apparatus 13 as shown in FIG. 1 includes a scanner unit 7 as an image input device, a printer unit 8 as an image output device, a controller unit 6, and an operation unit 9 as a user interface. Each of the scanner unit 7, the printer unit 8, and the operation unit 9 is connected to the controller unit 6. The controller unit 6 performs processing including image processing of image data output from the scanner unit 7, and outputs the processed image data to the printer unit 8.

According to the embodiment as shown, the controller unit 6 includes a determination unit 15. The determination unit 15 determines whether the image forming apparatus 13 is in a state in which the service center is to be informed thereof, due to occurrence of, for example, a paper jam or an error. That is, the determination unit 15 is configured to determine an abnormal state of the image forming apparatus. Even if an error occurs, if the error can be removed by an off-on operation of a power supply, the determination unit 15 determines that the service center is not necessarily informed of the error. However, if the error is difficult to remove, such as a fixing error or an error that cannot be automatically removed, the determination unit 15 determines whether service center is to be informed of the error. Further, even if the error is a type that can be automatically removed by an off-on operation of the power supply, if such an error is repeated a predetermined number of times, the determination unit 15 may determine that the service center 2 is to be notified of the error. Similarly, although a paper jam is generally removed by jam handling, and thus not reported to the service center, if the paper jam is repeated a predetermined number of times, the determination unit may determine that the service center is to be notified of the paper jam. This is because some image forming apparatuses may be unable to automatically recover from the error due to deterioration or failure of a part.

The operation unit 9 includes a USB interface (I/F) unit 10 that allows connection (and removal) of a USB memory, a SD card interface (I/F) unit 11 that allows connection (and removal) of a SD card, and another I/F 14 that allows connection of a recording medium (e.g., memory) other than the SD card or the USB memory. Data generated by the controller unit 6 can be stored in the above-described memories via these interface units. Further, a display unit 12 used for displaying information is provided on the operation unit 9. The display unit 12 may be, for example, a liquid crystal display (LCD). According to the present exemplary embodiment, a barcode can be displayed on the display unit 12. Further, a service request key 16, which the user presses when the user sends out a service request, is provided on the operation unit 9.

According to one embodiment, if the determination unit 15 determines that the image forming apparatus 13 is in an abnormal state, a device is selected from among a plurality of devices (i.e., a plurality of output units) that are capable of receiving information from the image forming apparatus. Subsequently, the information is output to the selected device to be stored in a recording medium, and then sent to the service center 2 via the recording medium. Similarly, if the user determines that the main body of the image forming apparatus 13 is in an abnormal state and presses the service request key 16, information is also sent to the service center 2.

In one version, if the user selects error report for providing information to the service center 2, then the user prints the error report using the printer unit 8 and transmits the error report to the service center 2 via the facsimile machine 3 connected to the communication line 1. This is called offline processing 1. The error report can also be transmitted to the service center 2 via a scanner connected to the personal computer 4.

Further, in another version, if the user selects a USB memory or a SD card for sending information to the service center 2, then the user writes data into a USB memory connected to the USB interface (I/F) unit 10. After that, the user sends the data stored in the USB memory to the service center 2 by using the personal computer 4 connected to the communication line 1. This is called offline processing 2. Also, if the user selects a SD card or a different memory medium, information can be transmitted to the service center 2 in a similar manner.

Further, in one version, if the user selects telephone for providing information to the service center 2, then the user calls the service center 2 and provides information displayed on the display unit 12 or provides the information output from the printer unit 8 by telephone. This is called offline processing 3. Furthermore, in another version, if the user selects barcode for providing information to the service center 2, then the user takes a photograph of a barcode displayed on the display unit 12 with a camera-equipped cellular phone (the telephone apparatus 5) and sends the result to the service center 2. If the user uses a digital camera for taking the photograph of the barcode, the information is sent to the service center 2 via the personal computer 4 similarly.

Figure 2:
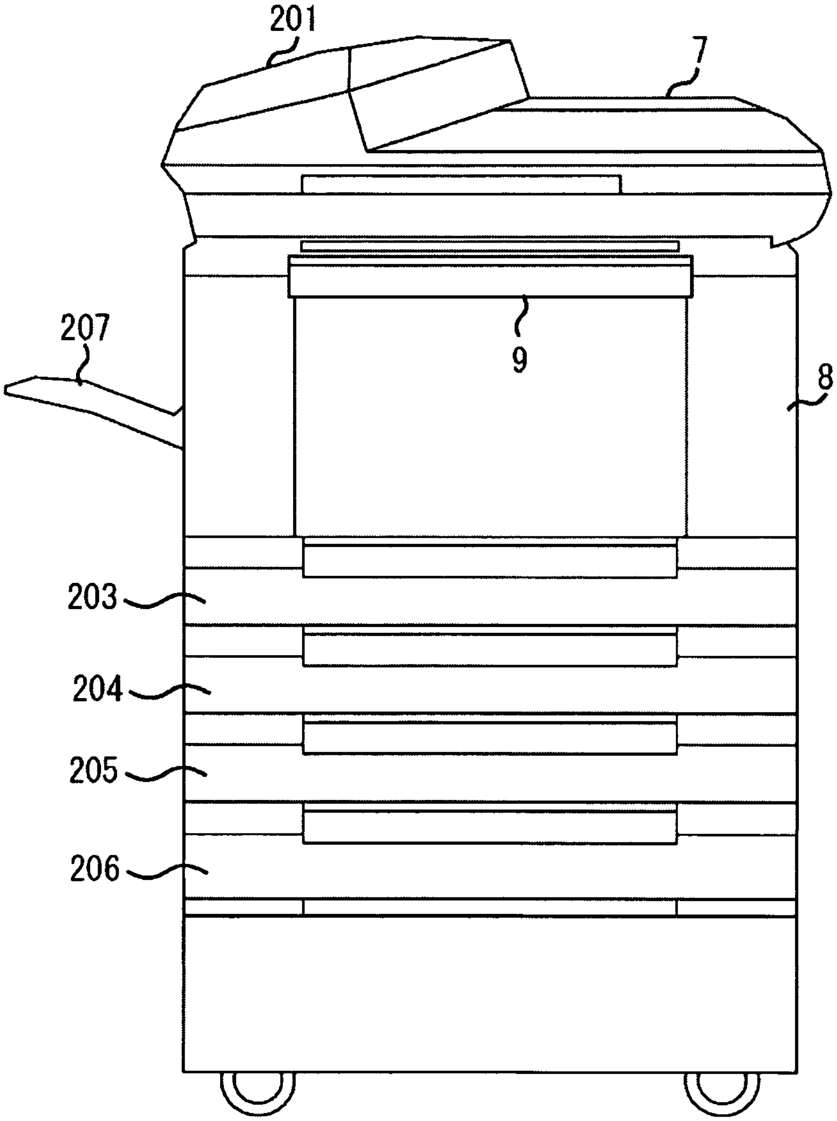
FIG. 2 illustrates an example of an appearance of an image forming apparatus.

FIG. 2 illustrates an example of an appearance of the image forming apparatus. According to the embodiment as shown, the scanner unit 7 as an image input device illuminates a document image with a lamp, scans the image using a CCD line sensor (not shown), converts the scanned image into an electric signal, and processes the signal as image data. The document is set on an automatic document feeder 201.

When the user gives an instruction via the operation unit 9 for starting to scan a document, the automatic document feeder 201 starts a document-scanning operation. Each document is separated from another by a retard-type separation control using frictional force. According to this retard-type separation control, misfeeding due to double feeding can be prevented. Accordingly, the document can be fed one by one by the automatic document feeder 201 during the document scanning operation.

The printer unit 8 as an image output device converts the image data into an image to be formed on a sheet. According to the present exemplary embodiment, the image is formed by electrophotography using a photosensitive drum and an intermediate transfer belt. However, as another example, an ink jet printer, in which an image is directly printed on a sheet by inks discharged from an extremely small nozzle array, can also be used. The print operation is started according to an instruction issued by the controller unit 6 described below. The printer unit 8 includes a plurality of paper feeders so that paper of a different size and of a different orientation can be printed. Print paper cassettes 203, 204, 205, and 206, each of which corresponds to each of the plurality of paper feeders, may also be included in the printer unit 8. The image-formed paper is discharged on a discharge tray 207.

Figure 3:
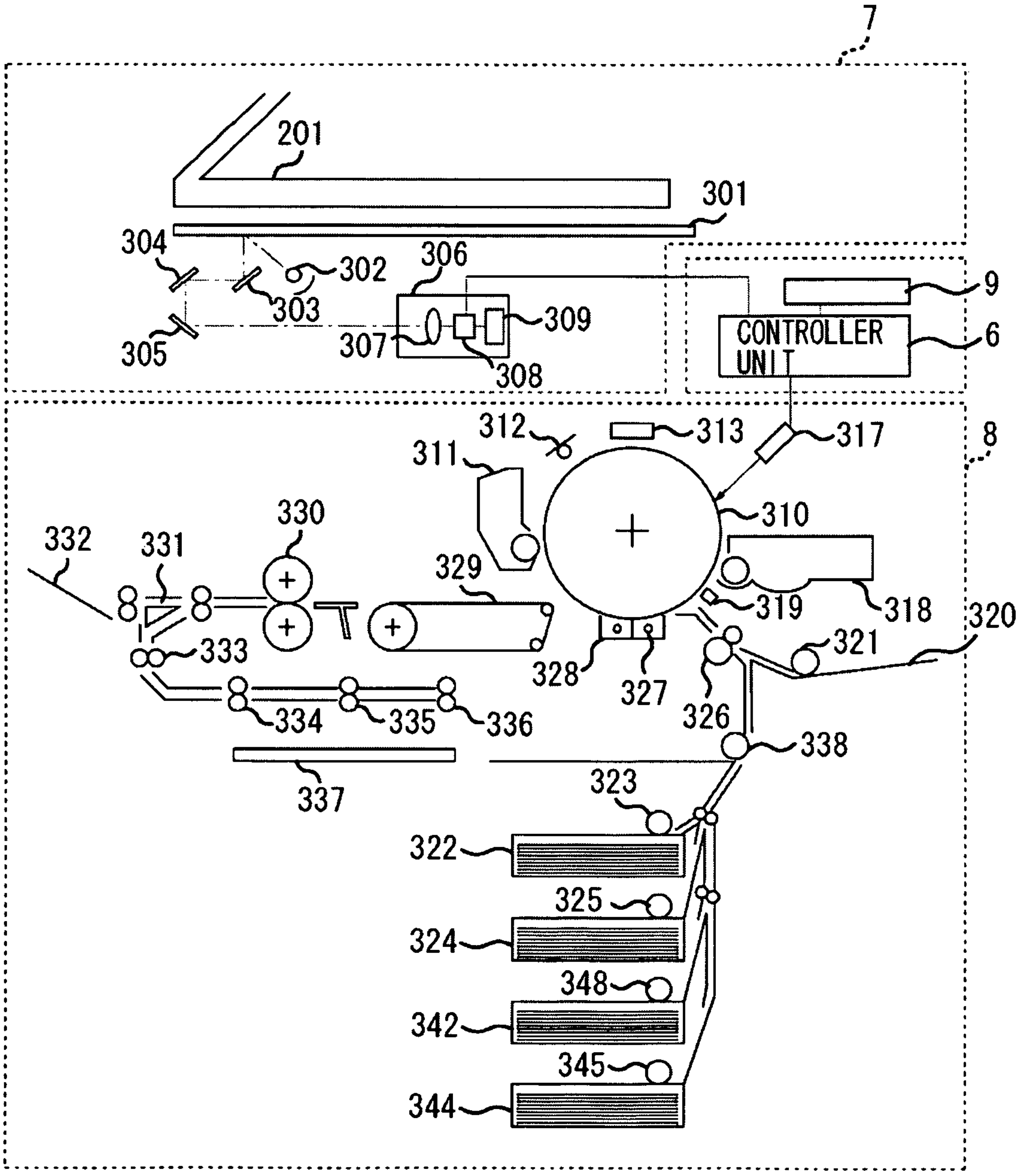
FIG. 3 is a cross section of an example of an inner configuration of the image forming apparatus.

FIG. 3 is a cross section of an example of an inner configuration of the image forming apparatus. In the scanner unit 7, each document fed from the automatic document feeder 201 is sequentially set on a predetermined position on a platen 301. A document lamp 302 may be, for example, a halogen lamp. The document lamp 302 illuminates the document set on the platen 301.

Scanning mirrors 303, 304, and 305 are contained in an optical scanning unit. While moving in a reciprocal manner, the scanning mirrors 303, 304, and 305 lead the light reflected from the document onto a CCD unit 306. The CCD unit 306 includes an imaging lens 307 by which an image is formed on the CCD using the light reflected from the document, an image sensor 308 (e.g., a CCD), and a CCD driver 309, which drives the image sensor 308. An image signal output from the image sensor 308 is converted into, for example, 8-bit digital data, and then output to the controller unit 6.

In the printer unit 8, a charge remaining on a photosensitive drum 310 may be removed by a pre-exposure lamp 312 before an image forming process. A primary charging device 313 uniformly charges the surface of the photosensitive drum 310. An exposure unit 317 may include, for example, a semiconductor laser. Based on image data processed by the controller unit 6, which controls the image forming process and the whole apparatus, light is emitted onto the photosensitive drum 310 by the exposure unit 317. Then, an electrostatic latent image is formed on the drum. A developer 318 may include black developer (e.g., toner). A pre-transfer charging device 319 may be used for applying high voltage to the toner image developed on the photosensitive drum 310 before it is transferred onto the paper.

Sheets on a manual paper feed unit 320 and sheets in paper feed units 322, 324, 342, and 344, which are placed in paper cassettes 203, 204, 205, and 206, respectively, are fed one by one into the apparatus by driving feeding rollers 321, 323, 325, 348, and 345.

The paper is stopped for a time at a registration roller 326. When write-start timing of the image formed on the photosensitive drum 310 becomes appropriate, the feeding of the paper is started again. At this time, by controlling a retard roller used in a friction separation method, the paper is separated and fed one by one without being double fed and conveyed. Depending on a type of the paper, the rotation of the retard roller may be controlled to stop the separation control of the sheets.

A transfer charging device 327 transfers a toner image developed on the photosensitive drum 310 onto the paper that has been fed. A separation charging device 328 separates the image-transferred paper from the photosensitive drum 310. Toner that remains untransferred on the photosensitive drum 310 may be collected by a cleaner 311.

According to the embodiment as shown, a conveyance belt 329 is used for conveying the image-transferred paper to a fixing device 330. The image-transferred paper is fixed by the fixing device 330, for example, by application of heat. A conveyance path of the toner-fixed paper may be controlled by a flapper 331. According to the flapper 331, the toner-fixed paper is conveyed in the direction of either a sorter 332 or an intermediate tray 337. Feed rollers 333 through 336 are used for conveying the toner-fixed paper to the intermediate tray 337 in a reverse or a non-reverse manner. The toner-fixed paper is reversed and conveyed to the intermediate tray 337 in multiplex printing, while the toner-fixed paper is not reversed and conveyed to the intermediate tray 337 in two-sided printing. A re-feed roller 338 is used for conveying the paper in the intermediate tray 337 to the position of the registration roller 326 again.

The controller unit 6 includes a microcomputer and an image processing unit and is configured to control the above-described image forming operation according to an instruction issued from a man-machine interface device such as the operation unit 9.

Figure 4:
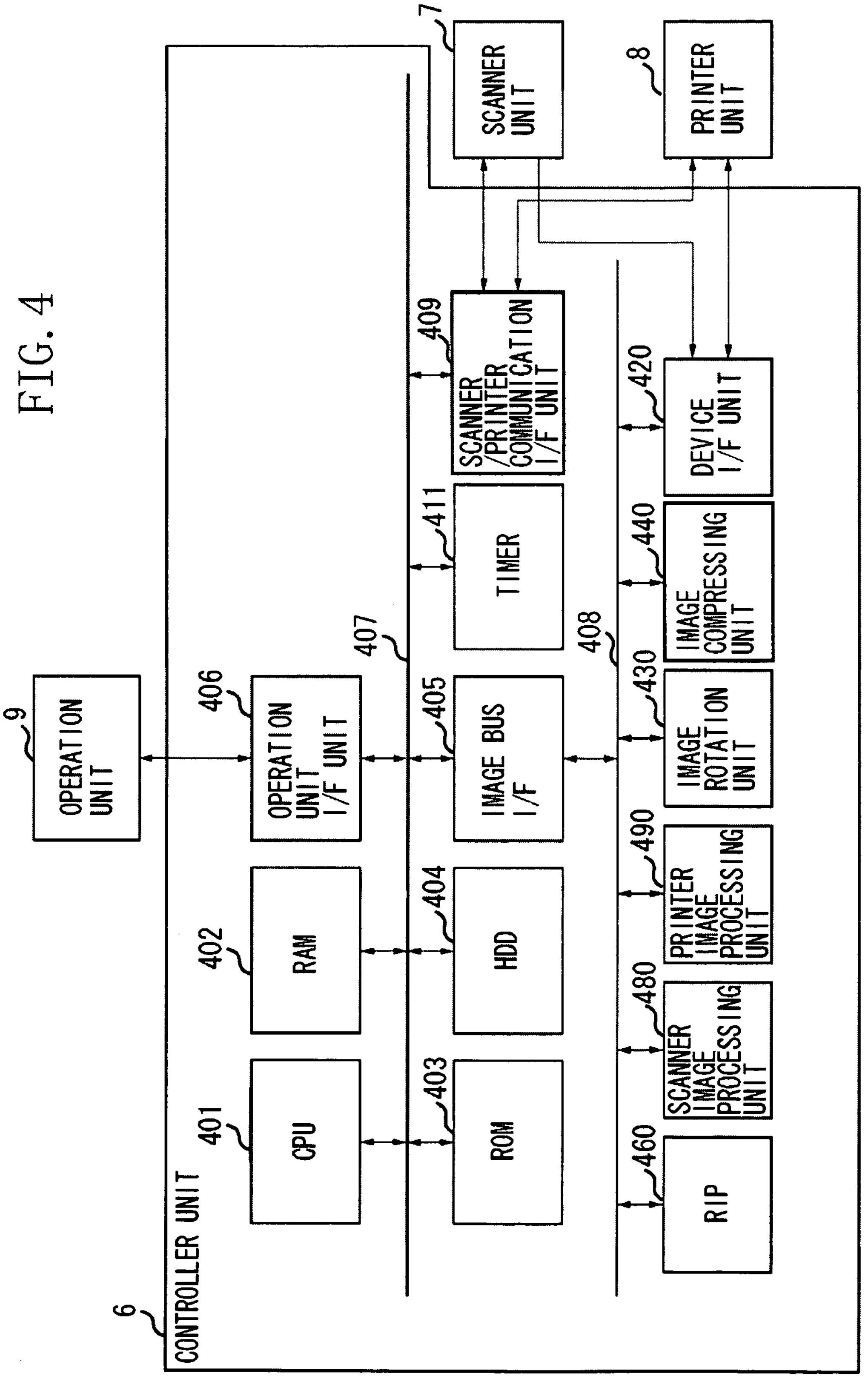
FIG. 4 illustrates an example of a configuration of a controller unit.

FIG. 4 illustrates an example of a configuration of the controller unit 6. The controller unit 6 is connected to the scanner unit 7 serving as an image input device or the printer unit 8 serving as an image output device. Further, the controller unit 6 exchanges various data, including image information and device information, between the personal computer 4 via a USB memory or the like.

A central processing unit (CPU) 401 is a controller configured to control the whole system. A random access memory (RAM) 402 is a volatile memory that allows high-speed writing. The RAM 402 may be, for example, a synchronous dynamic random access memory (SDRAM) or a static random access memory (SRAM). The SDRAM may serve as a system work memory that is used when the CPU 401 operates. The SDRAM may also serve as an image memory for temporarily storing image data. The SRAM is usually backed up by a backup battery (not shown). The SRAM may be used for storing user a setting such as a log level of log information.

A ROM 403 is a boot ROM. A device such as a rewritable flash ROM may be used for the ROM 403. A boot program and a setting value of the system may be stored in the ROM 403. A HDD 404 is a hard disk drive for storing, for example, system software, application software, image data, and log information.

An operation unit I/F 406 is an interface unit between the controller unit 6 and the operation unit (i.e., user interface) 9. The operation unit I/F 406 may be used for outputting image data displayed on the operation unit 9 to the operation unit 9. Further, the operation unit I/F 406 may be used for transmitting information input by the user of the system to the CPU 401. The user may input the information using the operation unit 9. A scanner/printer communication I/F unit 409 is an interface unit used for communication between the controller unit 6 and the CPU in the scanner unit 7 and the CPU in the printer unit 8 respectively. A timer 411 is used for setting time of the image forming apparatus and the controller unit or used for issuing an interruption signal at regular intervals. These devices are connected to a system bus 407.

An image bus I/F unit 405 is a bus bridge that connects the system bus 407 and an image bus 408 that is capable of transferring image data at a high speed. Data structure is converted by the image bus I/F unit 405. The image bus 408 includes a PCI bus or an IEEE 1334 bus. Various devices described below may be connected to the image bus 408. A device I/F unit 420 connects the scanner unit 7 or the printer unit 8 as an image input/output device and the controller unit 6, and performs synchronous/asynchronous conversion of the image data. A scanner image processing unit 480 may correct, process, and edit image data input from the scanner 7. A printer image processing unit 490 may make corrections on the image data to be printed and convert its resolution to be suitable for the printer. An image rotation unit 430 is used for rotating the image data. An image compression unit 440 is used for compressing/decompressing multivalued image data into Joint Photographic Experts Group (JPEG) and binary image data into at least one of Joint Bi-level Image experts Group (JBIG), Modified Modified Read (MMR), and Modified Huffman (MH). The RIP 460 is a processor for rasterizing a PDL code into a bitmap image.

Control of the operations of the system may be realized by the CPU 401 by loading system software stored in the HDD 404 into the RAM 402 and executing it. Further, a function of the determination unit 15 in the controller unit 6 may be realized by execution of the CPU 401 of the system software. Operating states may be recorded in the RAM 402 or the HDD 404 as log information. The recorded log information may be stored on various types of memories in the operation unit 9, outputs by the printer unit 8, or otherwise stored in a memory in the controller unit 6. Further, information on a state of the image forming apparatus, such as version information, configuration information, paper jam information, and error information, may also be recorded in the RAM 402 or the HDD 404 (i.e., storage units).

Figure 5:
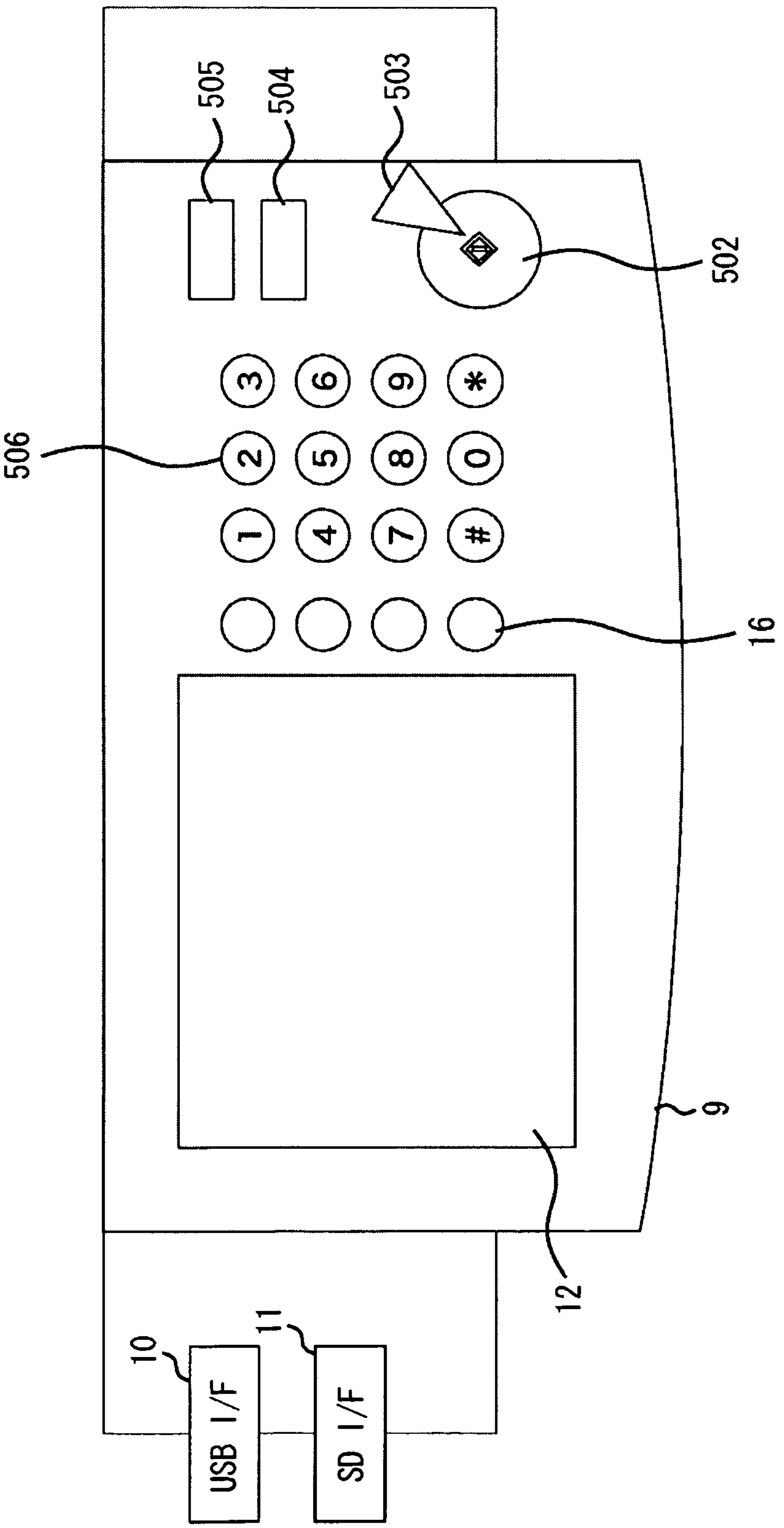
FIG. 5 illustrates an example of an appearance of an operation unit.

FIG. 5 illustrates an example of an appearance of the operation unit 9. A liquid crystal operation panel (i.e., a display unit) 12 is a combination of a liquid crystal panel and a touch panel, and used for displaying setting and softkeys. A start key 502 is a hardkey used for instructing to start operation such as copy operation. The start key 502 includes green and red LEDs. The green LED is on when operation such as copy operation can be started. The red LED is on when the operation such as the copy operation cannot be started.

A stop key 503 is a hardkey which the user presses when the user stops operation. In addition to the above-described hardkeys, a hardkey group 506 includes numeric keys, a clear key 505, a reset key 504, a guide key, a user mode key, and the service request key 16. The service request key 16 also can serve as a counter key. Further, the USB interface (I/F) unit 10 that allows connection with a USB memory and the SD card interface (I/F) unit 11 that allows connection with a SD card are also provided on the operation unit 9. Information in the controller unit 6 is stored in an external memory via these interface units.

Figure 6:
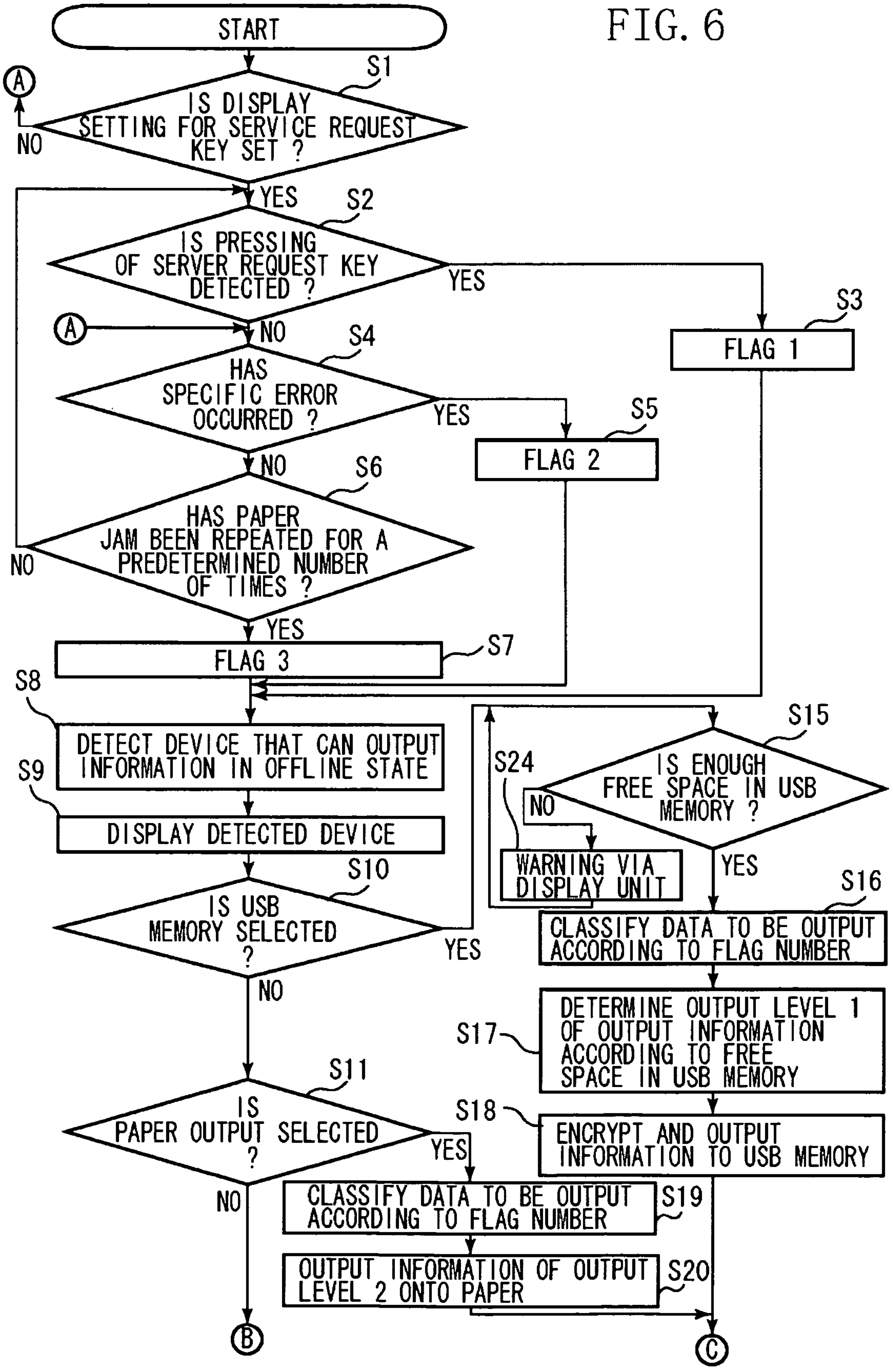
FIG. 6 is a flowchart illustrating an example of an operating procedure concerning maintenance management of the image forming apparatus according to the first exemplary embodiment of the present invention.
Figure 7:
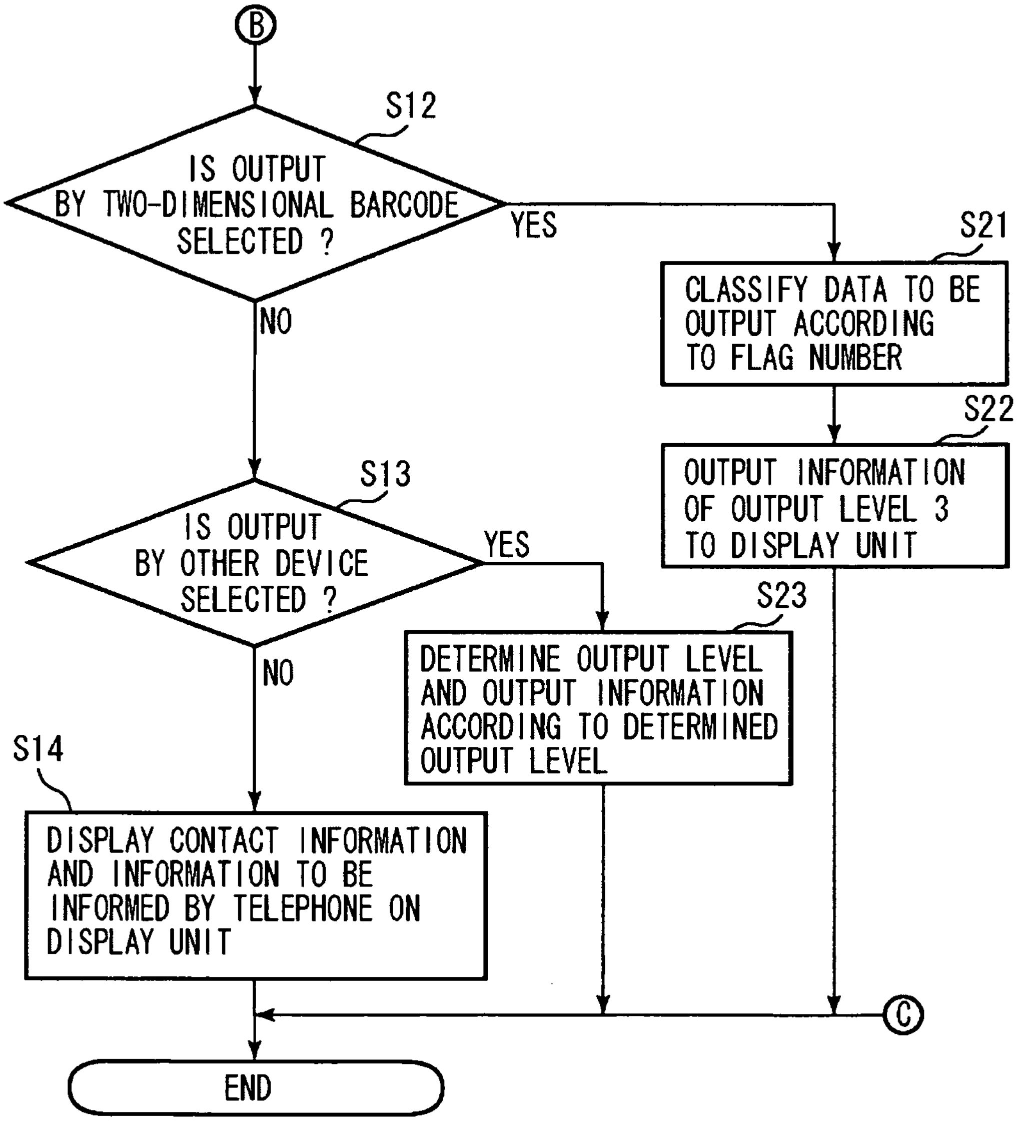
FIG. 7 is a flowchart illustrating an example of an operating procedure concerning maintenance management of the image forming apparatus continued from FIG. 6 according to the first exemplary embodiment of the present invention.

Next, operation of the image forming apparatus having the above-described configuration will be described. FIGS. 6 and 7 are flowcharts illustrating an example of an operating procedure of maintenance management of the image forming apparatus. The processing program may be stored in the ROM 403 in the controller unit 6 and executed at regular intervals by the CPU 401 in the controller unit 6.

In step S1, if a service request key 16 provided on the operation unit 9 is pressed by the user, the controller unit 6 determines whether the setting of the image forming apparatus 13 is set to allow notification to the service center when the service request key 16 is pressed. If such setting is not set (NO in step S1), then the process proceeds to step S4. On the other hand, if the setting is set (YES in step S1), then in step S2, the controller unit 6 determines whether pressing of the service request key 16 is detected.

If the pressing of the service request key 16 is detected (YES in step S2), then the processing proceeds to step S3. In step S3, the controller unit 6 sets a flag 1, and the processing proceeds to step S8. The service request key 16 may be pressed by the user when the user determines that the image forming apparatus 13 is in an abnormal state and that the state should be notified to the service center 2. For example, the service request key 16 may be pressed when the user notices one or more of an image defect, a specific paper jam, frequent paper jams, abnormal noise, and abnormal odor, and determines that the image forming apparatus is in a state different from the normal state.

On the other hand, in step S2, if the pressing of the service request key 16 is not detected by the controller unit 6, then the processing proceeds to step S4. In step S4, the controller unit 6 determines whether occurrence of a specific error, that is, an error to be notified of to the service center, has been detected during the image forming process or the non-image forming process. According to the present exemplary embodiment, an error may be determined to be specific if the determination unit 15 in the controller unit 6 determines that the image forming apparatus is unable to recover automatically even if the power supply is turned off and on again, or if the determination unit 15 determines that the error is a complicated error and that the operation is difficult to continue. In step S4, if occurrence of the specific error is detected (YES in step S4), then the processing proceeds to step S5. In step S5, the controller unit 6 sets a flag 2, and then the processing proceeds to step S8.

On the other hand, in step S4, if occurrence of the specific error is not detected (NO in step S4), then in step S6, the controller unit 6 determines whether the paper jam has occurred a predetermined number (i.e., a specified number) of times. Even if the paper jam occurs during the image forming processing, the paper jam is corrected if normal paper jam processing is performed. Thus, the determination unit 15 determines that the service center is not to be notified of the error. However, if a similar paper jam is repeated a predetermined number of times, the determination unit 15 determines that the image forming apparatus is unable to recover automatically due to, for example, abrasion of a conveyance roller or failure of a sensor, even after jam processing is performed, and thus determines that the part is to be replaced. Thus, if a similar paper jam is repeated a predetermined number of times (YES in step S6), then the process proceeds to step S7. In step S7, according to the determination of the determination unit 15, the controller unit 6 determines that the error is a paper jam that the service center is to be notified of, and sets a flag 3. Then, the processing proceeds to step S8. On the other hand, if a similar paper jam is not repeated a predetermined number of times (NO in step S6), then the processing returns to step S2.

In step S8, the controller unit 6 searches a device (i.e., notification device) that is capable of outputting information on a state of the image forming apparatus to external equipment when the image forming apparatus is in an offline state. According to the present exemplary embodiment, as described above, at least one of the USB memory I/F unit 10, the SD card I/F unit 11, and the infrared communication I/F unit may be detected as the notification devices. Further, at least one of the printer unit 8 to be used for outputting an error report on a sheet, the display unit 12 to be used for displaying a two-dimensional barcode, and the display unit 12 to be used for displaying a telephone number of the service center so that notification can be made by telephone, may be detected as notification devices. It is to be noted that these devices are just examples. If a device (e.g., interface unit) that can output data to a recording medium is available other than the above-described examples, the notification device may be searched for from a wider range of options. Such a device may be, for example, at least one of a flexible disk, a SmartMedia® card, and a CompactFlash® card. The notification device may be searched for differently depending on the types of errors. For example, if a paper jam occurs, the printer unit 8 may not be searched for as the notification device. In other words, according to the search processing in step S8, the occurred error is examined and a notification device which is not affected by the error is searched for based on the result of the examination.

Figure 8:
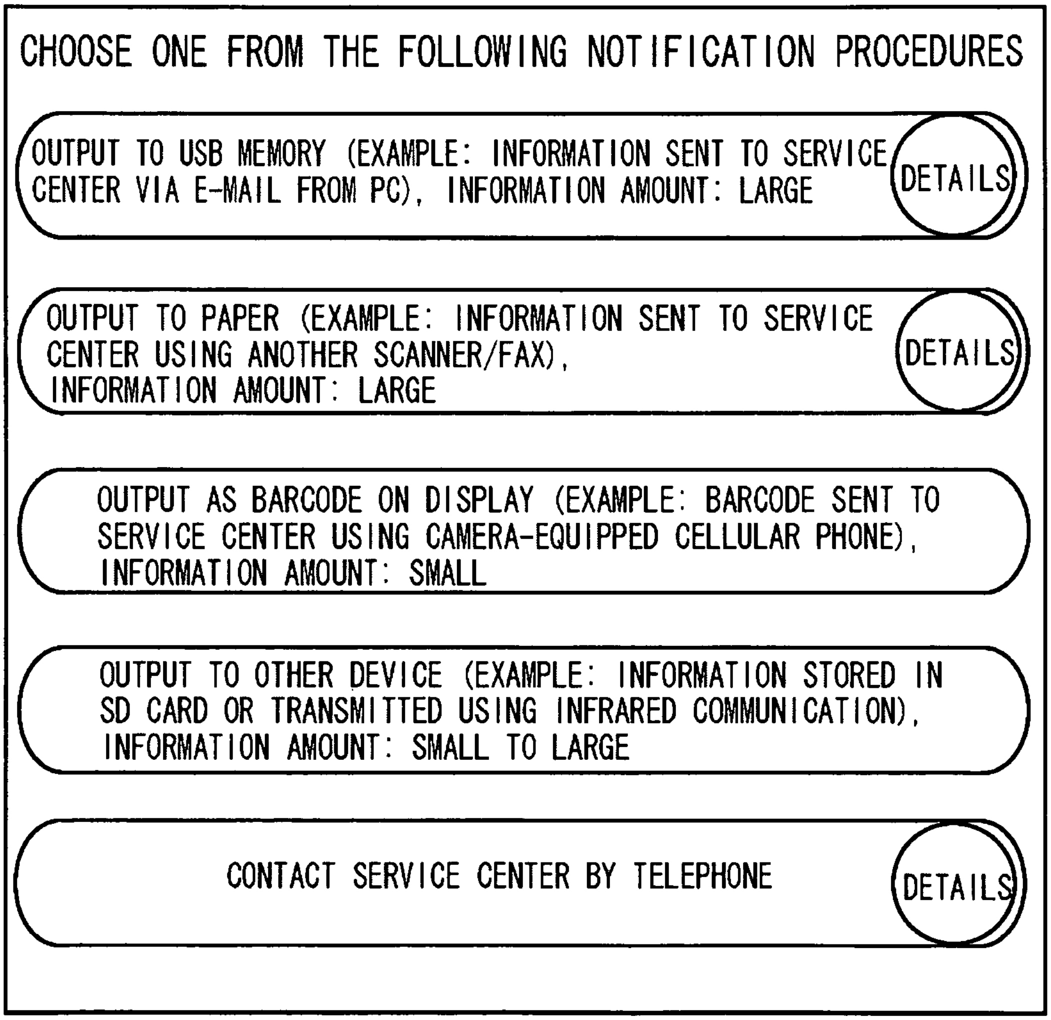
FIG. 8 illustrates an example of a selection screen which the user uses when the user selects a notification device from a list of notification devices that have been searched.

In step S9, the controller unit 6 displays the device searched in step S8 on the display unit 12. FIG. 8 illustrates an example of a selection screen that the user may use when the user selects the notification device from a list of notification devices that have been searched for. Information regarding at least the types of each device may be displayed on the selection screen of the display unit. As is illustrated in the example in FIG. 8, the screen may be more user-friendly if detailed information of the notification is displayed on the selection screen. The detailed information may be, for example, at least one of a device type, a notification method to the service center, amount of information that can be sent, and detail key used for checking the data to be delivered.

For example, if a device to be used for outputting data to a USB memory is selected as the notification device, notification to the service center may be performed by attaching an information file stored in the USB memory to an electronic mail to the service center using a PC. Further, if a device to be used for outputting data on paper is selected as the notification device, notification to the service center may be performed by scanning the output paper by another scanner apparatus or a facsimile machine. Further, if a device to be used for outputting a barcode on the display unit is selected, notification to the service center may be performed by taking a photograph of the barcode displayed on the screen with, for example, a camera-equipped cellular phone.

Figure 9:
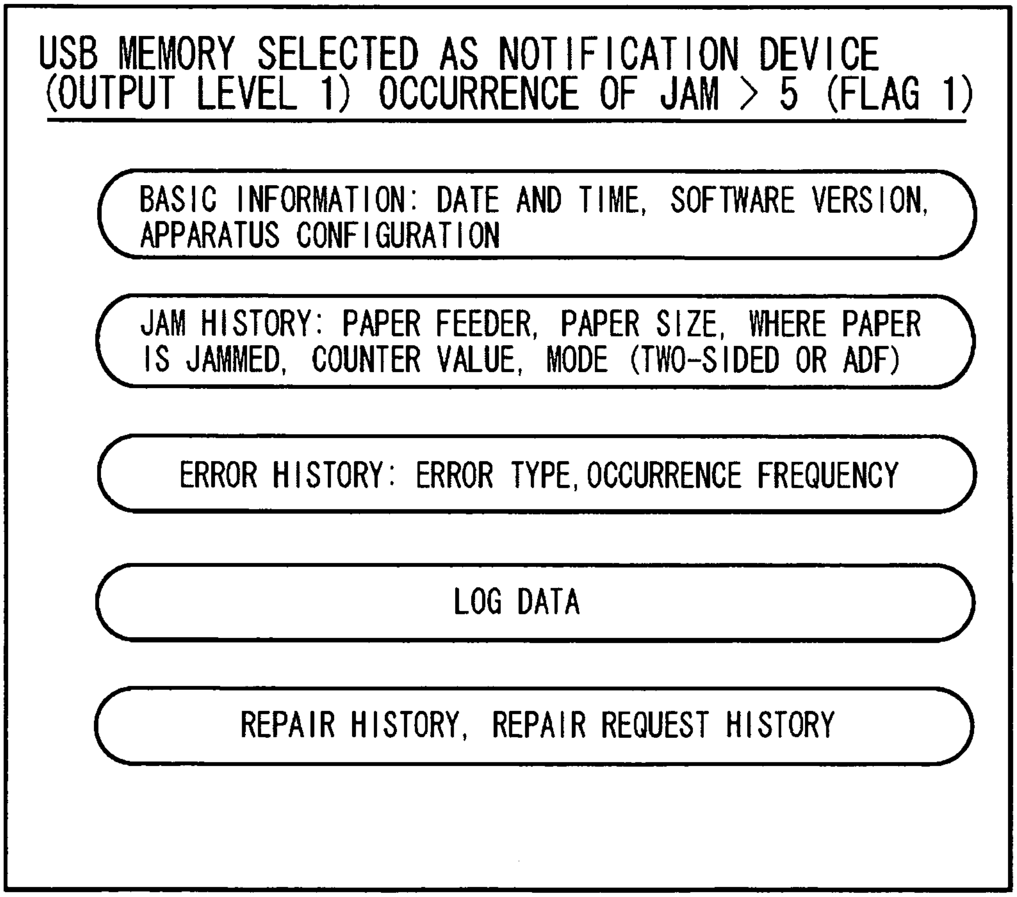
FIG. 9 illustrates an example of a screen which the user uses when the user confirms a type of information to be stored in a USB memory when a paper jam occurs a number of times exceeding a predetermined number.

In step S10, the controller unit 6 determines whether the user has selected "notification to service center using USB memory" from the list. If the "notification to service center using USB memory" has been selected, for example, an operation screen illustrated in FIG. 9 may be displayed. FIG. 9 illustrates an example of a screen which the user may use when the user confirms a type of information to be stored in the USB memory when the paper jam has occurred a number of times exceeding a specified number.

In step S10, if the controller unit 6 determines that the user has selected the "notification to service center using USB memory" (YES in step S10), then the processing proceeds to step S15. In step S15, if a connection of a USB memory to the USB interface (I/F) unit 10 is detected, the controller unit 6 determines whether enough free space exists in the USB memory. If a connection of a USB memory is not detected, or if a USB memory is connected but the connected USB memory does not have enough free space (NO in step S15), then the processing proceeds to step S24. In step S24, the controller unit 6 displays a warning on the display unit 12. Then, the processing returns to step S15.

In step S15, if a connection of a USB memory to the USB interface (I/F) unit 10 is detected, and if the controller unit 6 determines that enough free space exists in the USB memory, in other words, if the data can be output to the USB memory (YES in step S15), then the processing proceeds to step S16. In step S16, the controller unit 6 reads the flag number and classifies data to be output.

To be more precise, if the flag 1 is detected, the user may select items to be notified from the items displayed on the operation unit 9, and may classify information according to the selection. However, if an unusual noise, a strange odor, or an abnormal image occurs, in many cases, information on the state of the image forming apparatus may not be enough for determining the error. Thus, a minimum amount of information including, for example, one or more of configuration information (see, e.g., FIG. 11), past repair history, and service request history may often classified as the information for notification.

Further, if flag 2 is detected, at least one of software version information (see, e.g., FIG. 10) of each unit of the information processing apparatus, configuration information (see, e.g., FIG. 11), error information (see, e.g., FIG. 13), log information (see, e.g., FIGS. 14A and 14B), and warning information may be classified as the information to be output.

The warning information may include information that is issued, for example, when a high-pressure leak occurs once on the surface of the photosensitive drum 310. Although possibility of error due to high-pressure leak becomes may become high only when the leak is repeated a plurality of times, a warning may be issued even if the high-pressure leak occurs only once and such information is stored in a database. Since the information can be useful in analyzing cause of failure, according to the present exemplary embodiment, the information may be classified as the information to be added if the flag 2 is detected. Further, it may also be effective to add past repair history and service request history to the information to be added.

Further, if flag 3 is detected, at least one of software version information (see, e.g., FIG. 10) of each unit of the information processing apparatus, configuration information (see, e.g., FIG. 11), jam information (see, e.g., FIG. 12), and log information (see, e.g., FIGS. 14A and 14B) may be classified as the information to be output. One or more of error information (see, e.g., FIG. 13), past repair history, and service request history can also be added to the information to be output.

In this way, by using the flags 1, 2, and 3, it may become possible to limit the amount of information that is output to the external equipment according to the abnormal state of the image forming apparatus.

Figure 10:
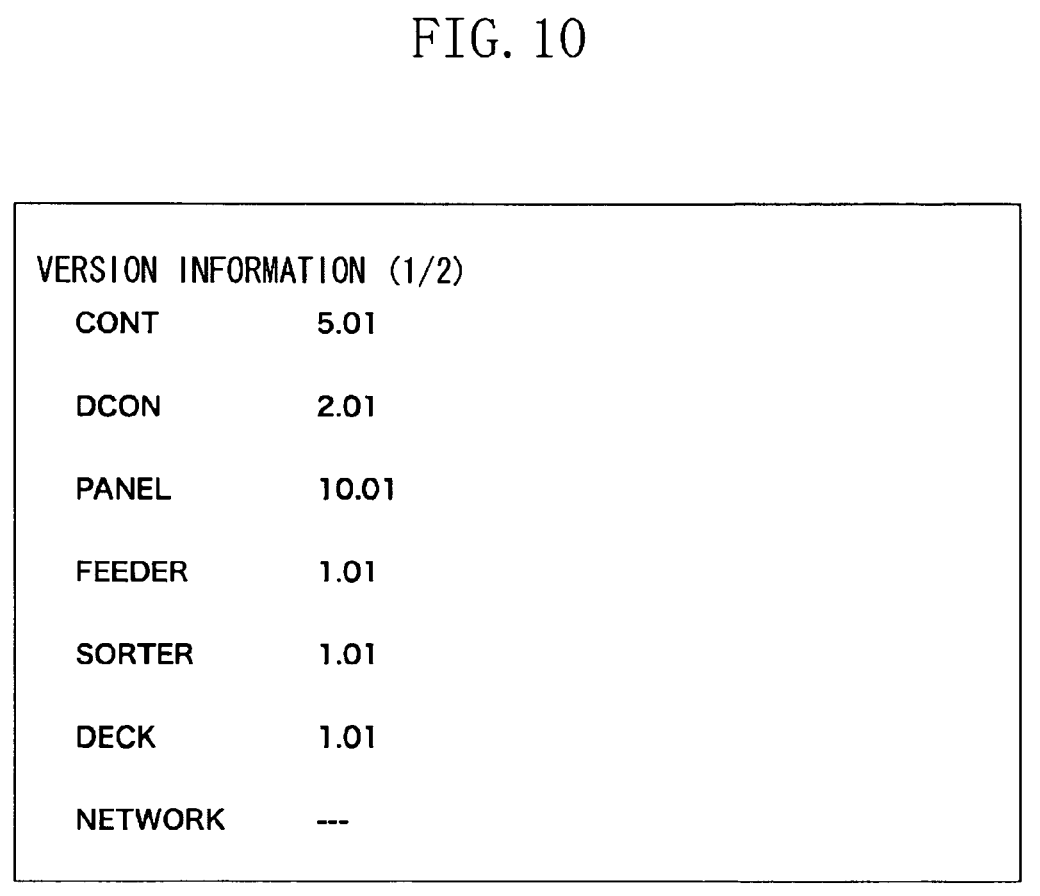
Figure 12:
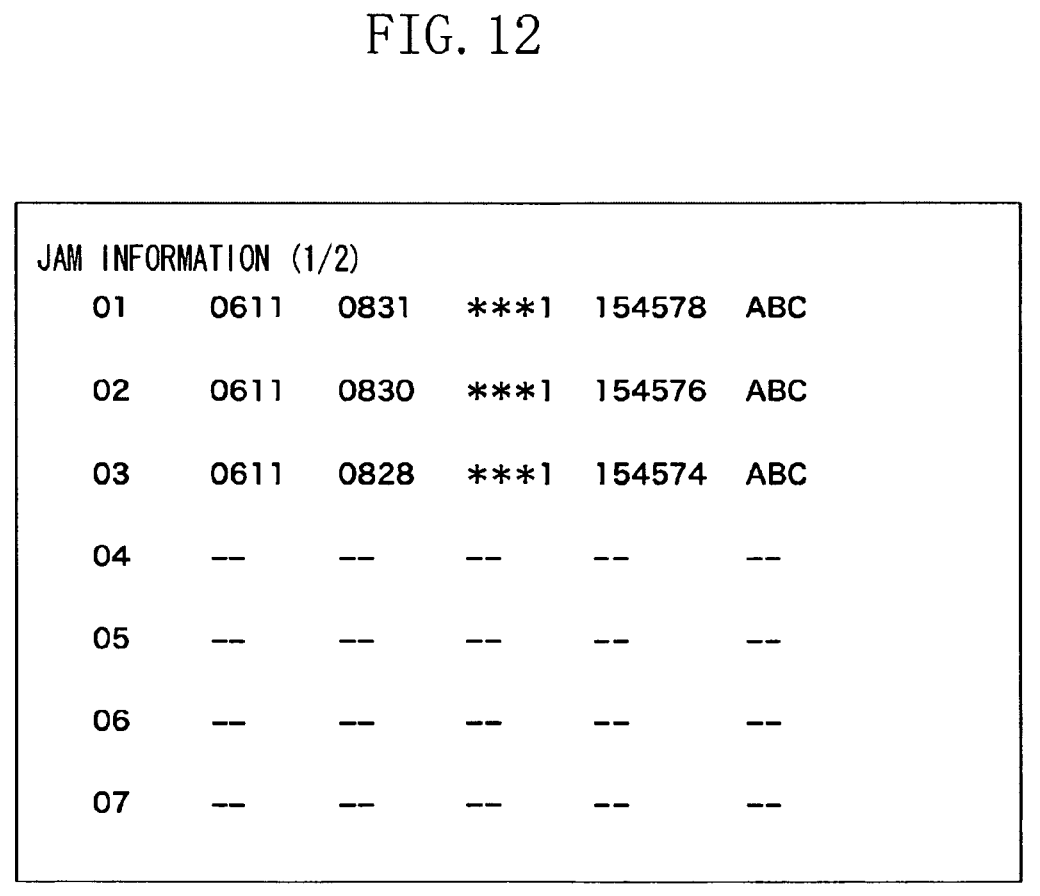

FIG. 10 illustrates an example of software version information (VER information) of each unit in the image forming apparatus. FIG. 11 illustrates an example of configuration information of units that may configure the image forming apparatus. FIG. 12 illustrates an example of paper jam information. FIG. 13 illustrates an example of error information. FIGS. 14A and 14B illustrate examples of log information of an operating condition of the image forming apparatus at the time of error. Details on such information will be described below.

Returning to FIG. 6, in step S17, the controller unit 6 determines an output level 1 of information according to a free space in the USB memory. More specifically, if enough free space is in the USB memory, the controller unit 6 may store all types of information as well as detailed log information in the memory. If the capacity of the USB memory is not enough, the controller unit 6 may select the data to be stored in the memory according to a predetermined priority order.

The amount of information included in the log information (see, e.g., FIGS. 14A and 14B) may differ greatly depending on whether the information is detailed or not. Simple log information may have, for example, several kilobytes for one job, whereas detailed log information may have several megabytes for one job. Thus, if a device having a large capacity, such as for example the USB memory, is selected, and if the device has enough free space, in other words, if the amount of information that can be output is larger than a defined value, or if the image forming apparatus has been repaired in the past, it may be useful to store detailed log information. On the other hand, if the amount of information that can be output is below a defined value, it may be advantageous to store simple log information. Thus, according to the present exemplary embodiment, the amount of information to be output can be changed according to the type and the state of the device.

In step S18, the controller unit 6 encrypts the information before it is output to the USB memory, since the information may include confidential information such as log information. Then, the processing ends.

Although the present exemplary embodiment is described using the USB memory, processes in steps S8 through S18 can be also applied using other storage media. Further, although whether data can be output to the USB memory is determined in step S15 according to the present exemplary embodiment, it can also be determined after step S16.

When data is stored in the USB memory, as described referring to FIG. 1, the user may send the data stored in the USB memory to the service center 2 using the personal computer 4 connected to the communication line 1.

However, in step S10, if the controller unit 6 determines that the user has not selected "notification to service center using USB memory" (NO in step S10), then in step S11, the controller unit 6 determines whether the user has selected "output on paper" via the display unit 12. If the controller unit 6 determines that the user has selected "output on paper" (YES in step S11), then the processing proceeds to step S19. In Step S19, the controller unit 6 classifies information (e.g., data) to be output according to the flag number. This processing is similar to that in step S16. In step S20, from the information classified in step S19, the controller unit 6 prints information of output level 2 onto paper and outputs an error report (e.g., paper jam report). Then, the processing ends.

Figure 15:
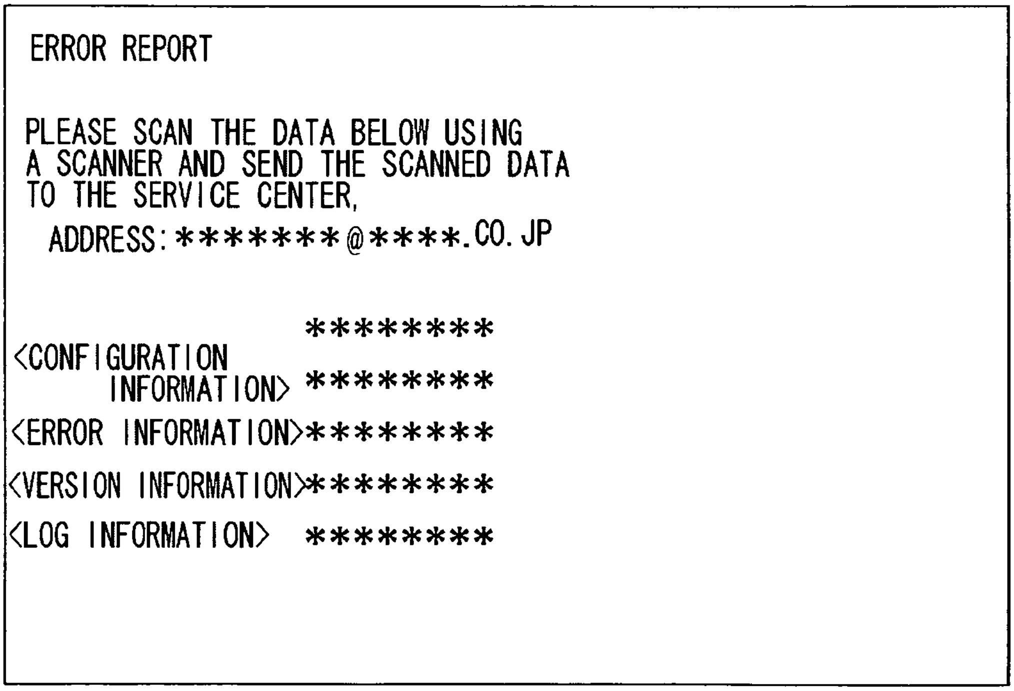
FIG. 15 illustrates an example of an output format of an error report.

FIG. 15 illustrates an example of an output format of the error report. The error report is an example of information of output level 2. In the error report, one or more of the above-described version information, configuration information, error (e.g., paper jam) information, and simple log information may be classified as the information to be output. When the error report (e.g., paper jam report) is output from the printer unit 8, as described referring to FIG. 1, the user may send the error report to the service center 2 via the facsimile machine 3 connected to the communication line 1. The user can also send the error report to the service center 2 using the scanner unit 7 and via the personal computer 4.

On the other hand, in step S11, if the controller unit 6 determines that "output on paper" is not selected by the user (NO in step S11), then the processing proceeds to step S12. In step S12, the controller unit 6 determines whether the user has selected output of two-dimensional barcode. If the controller unit 6 determines that the user has selected the output of two-dimensional barcode (YES in step S12), then the processing proceeds to step S21. In Step S21, the controller unit 6 classifies information (e.g., data) to be output according to the flag number. This process is similar to that in step S16. In step S22, from the information classified in step 21, the controller unit 6 generates a barcode as information of output level 3 and displays the barcode on the display unit 12 of the operation unit 9. Then, the processing ends.

Figure 16:
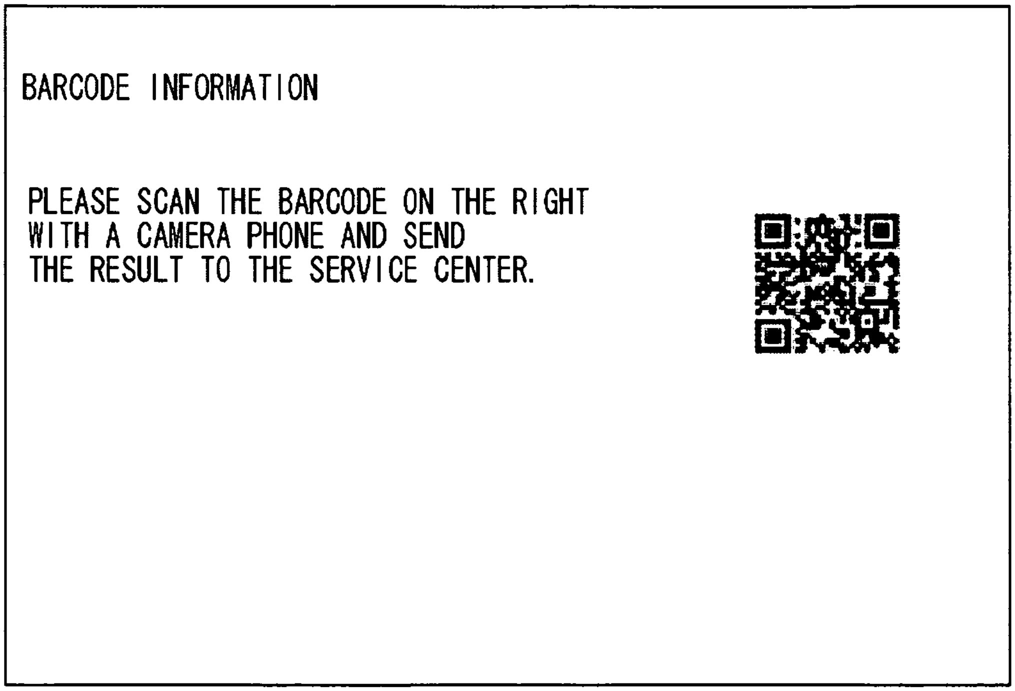
FIG. 16 illustrates an example of a barcode display.

FIG. 16 illustrates an example of the barcode. Currently, a two-dimensional barcode may hold more than 2000 characters. However, its capacity may still not be enough for handling log information. Thus, as an example of the output information of output level 3, one or more of the above-described version information, configuration information, and error (e.g., paper jam) information may be classified into the information to be output.

When a barcode is displayed on the display unit 12, as described referring to FIG. 1, the user may take a photograph of the barcode displayed on the display unit 12 with a camera-equipped cellular phone as the telephone apparatus 5, and may send the result to the service center 2. If the user uses a digital camera in taking the photograph of the barcode, the information can be sent to the service center 2 via the personal computer 4.

On the other hand, in step S12, if the user does not select output of two-dimensional barcode (NO in step S12), then in step S13, the controller unit 6 determines whether the user has selected another device to output data to external equipment. In step S13, if the controller unit 6 determines that the user has selected another device (YES in step S13), then the processing proceeds to step S23. In step S23, the controller unit 6 classifies information according to the flag number as is described above, and selects an output level (i.e., amount of information) that is appropriate for the device. For example, if the image forming apparatus 13 is connectable to the personal computer 4, the information can be directly provided to the personal computer 4. The process ends when the processing in step S23 ends.

Figure 17:
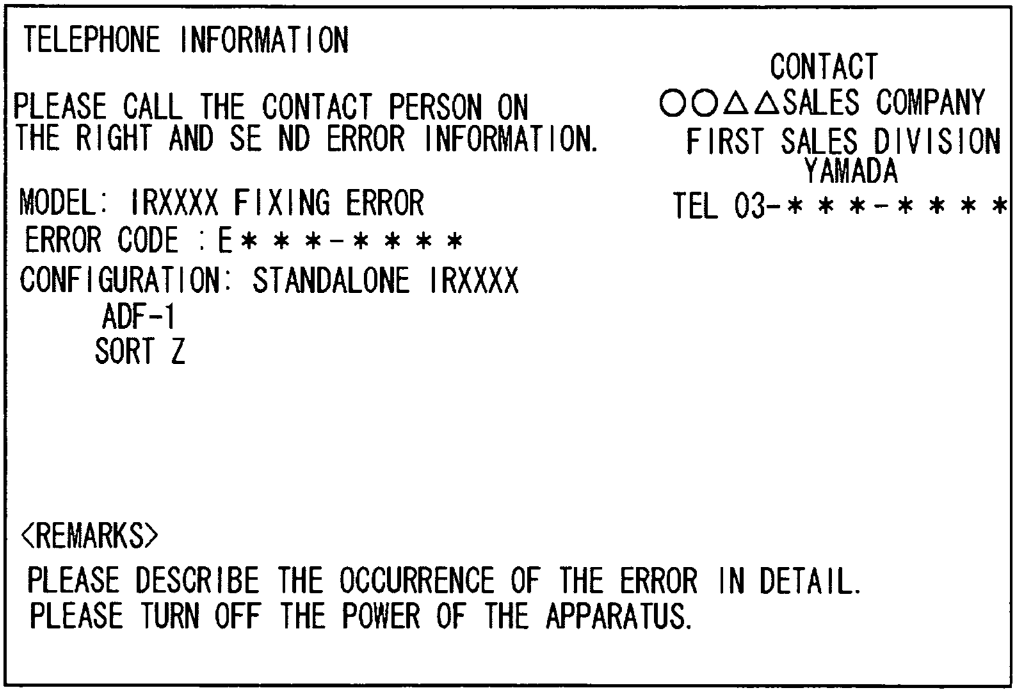
FIG. 17 illustrates an example of information including contact information displayed on a display unit.

On the other hand, in step S13, if another device is not selected by the user (NO in step S13), then in step S14, the controller unit 6 displays information such as contact information on the display unit 12 of the operation unit 9 so that the user can call the service center 2 in a conventional manner by telephone. The process ends when the processing in step S14 ends. FIG. 17 illustrates an example of information such as contact information of the service center displayed on the display unit 12. The controller unit 6 may also be capable of outputting the information via the printer unit 8 instead of displaying it on the display unit 12.

The version (VER) information described above referring to FIG. 10 is an example. The VER information may include software version information of each unit. In addition to the information on software that is installed, the VER information includes the version information on application software for the automatic document feeder or a finisher. Based on the VER information, the controller unit 6 may determine, based on the history, whether a combination of software versions is appropriate, or whether the combination has a potential cause for a problem.

The configuration information in FIG. 11 illustrates an example of configuration information of units that may configure the image forming apparatus. The configuration information includes information on the units connected to the image forming apparatus, applications, and expanded memory capacity. Based on the configuration information, the controller unit 6 may determine whether a combination of units is appropriate, or whether the combination has a potential cause for a problem based on the history.

The paper jam information illustrated in FIG. 12 is an example in which the history of any paper jams that occurred in the past is sorted in order of time. The paper jam information may include one or more of occurrence time, occurrence area, count number, and paper feed conditions (e.g., A3 cassette in the fourth stage). If a paper jam has occurred a plurality of times in similar areas under similar conditions in a certain period of time, then the paper jams can be assumed to have been caused by, for example, wear in a roller that has reached the end of its life, and a feeding roller of a certain cassette stage may need to be replaced.

The error (ERR) information illustrated in FIG. 13 is an example in which the history of errors that occurred in the past is sorted in order of time. The error (ERR) information may include one or more of occurrence time of the error, error code, count number, and occurrence conditions. The error information may be used for analyzing the error.

Log information illustrated in FIGS. 14A and 14B are examples of log information in which operating conditions of the image forming apparatus may be recorded when the error has occurred. This log information may be stored in an area of the RAM 402 reserved according to an operating condition of a program executed by the CPU 401. A model name “IRXXXX” of the image forming apparatus, a system software version “CONT ver. 0.42”, and a date of the log information acquisition are located at a header portion 602 and 606 of the log information.

Operating procedures 604 and 608 indicate time, block area, and operation. Based on such information, a cause of the paper jam or the error can be analyzed at the service center 2. Accordingly, a service engineer can prepare replacement parts or units before visiting the user. In this way, cost reduction, and reduction of downtime of the image forming apparatus, can be achieved.

For example, if “EEE initialize” in log information 601 illustrated in FIG. 14A does not terminate normally, failure of a part or end of life of a part relating to PRINT may be assumed to have caused the phenomenon. Thus, the service engineer will be able to prepare a part concerning EEE of the PRINT operation.

An amount of log information may differ greatly between log information 601 in FIG. 14A and log information 605 illustrated in FIG. 14B. The log information 601 is generally simple while the log information 605 is more detailed. It may be useful to change the amount of log information depending on the notification device. For example, detailed log information can be used for a large-capacity memory, and more simple log information can be used for outputting the log information on paper. The paper that is output may be transmitted to the service center via a facsimile machine by the user.

According to the present exemplary embodiment, if the image forming apparatus is in an abnormal state, an available device is selected from a plurality of devices. Then, stored information is output to the external equipment via the selected device. In this way, even when the image forming apparatus is in an offline state unconnected to the communication line, information on the state of the image forming apparatus can be output to the external equipment according to the environment of the user or the image forming apparatus. Accordingly, the user can supply the service engineer with information for analyzing the cause of the error substantially without going through complicated processes. Further, since the user can choose the notification method from various methods, usability is improved. Accordingly, aspects of the invention provide an image forming apparatus capable of outputting information on its state according to an environment of a user or the image forming apparatus, even when the apparatus is in an offline state unconnected to a communication line.

Further, according to the present exemplary embodiment, since an available device for notifying the service center of the state of the image forming apparatus can be selected from a plurality of devices displayed on the display unit and thus presented in a user-friendly manner, usability is improved.

According to the present exemplary embodiment, information that is appropriate for the device can be provided to the service center. Additionally, notification that is appropriate for providing information on the abnormal state to the service center can be performed. Furthermore, since service engineers may be able to know the one or more of the occurrence conditions, the occurrence place, and the number of times of the occurrence of a paper jam from the history of the paper jam, they may be able to determine the abnormality level, including whether replacement of parts may be necessary.

According to the present exemplary embodiment, information including at least one of the occurrence time of the error, error code, count number, and occurrence conditions can be obtained from the error history, and the service engineers can use the information for analyzing the cause for the error. Further, if the user determines that the image forming apparatus is in an abnormal state based on various factors, and if the user executes a specific operation (e.g., presses the service request key) via the operation unit, the service engineers will be able to know that an abnormal state has occurred. Additionally, if a notification device is available, the user may not need to call the service center by telephone, and thus usability of the image forming apparatus can be improved. Furthermore, since the user has more choices of notification methods, a more user-friendly environment can be realized.

According to the present exemplary embodiment, only the information that may be needed can be output according to the device. Further, by controlling details of the log information, the amount of information that is output can be relatively easily increased or decreased. Furthermore, even if the image forming apparatus is an offline machine unconnected to the communication line, information for analyzing the cause for the errors can be provided to the external apparatus (e.g., service center) substantially without complicated processes to be performed by the users.

While the image forming apparatus according to the first exemplary embodiment is an offline machine unconnected to the communication line, the image forming apparatus according to a second exemplary embodiment of the present invention is an online machine connectable to the communication line. Even if the image forming apparatus is an online machine, if a connection to a communication line such as a network or a telephone line is disconnected (e.g., including failure of the communication line), or if an abnormal state occurs with a facsimile transmission function or a network function, a trouble similar to that of the offline machine can occur. Since the configuration of the maintenance management system according to the second exemplary embodiment may be similar to that of the first exemplary embodiment, components similar to those in the first exemplary embodiment are denoted by the same reference numerals, and their description is omitted for simplification purposes. Description is provided for components not described in the first exemplary embodiment.

Figure 18:
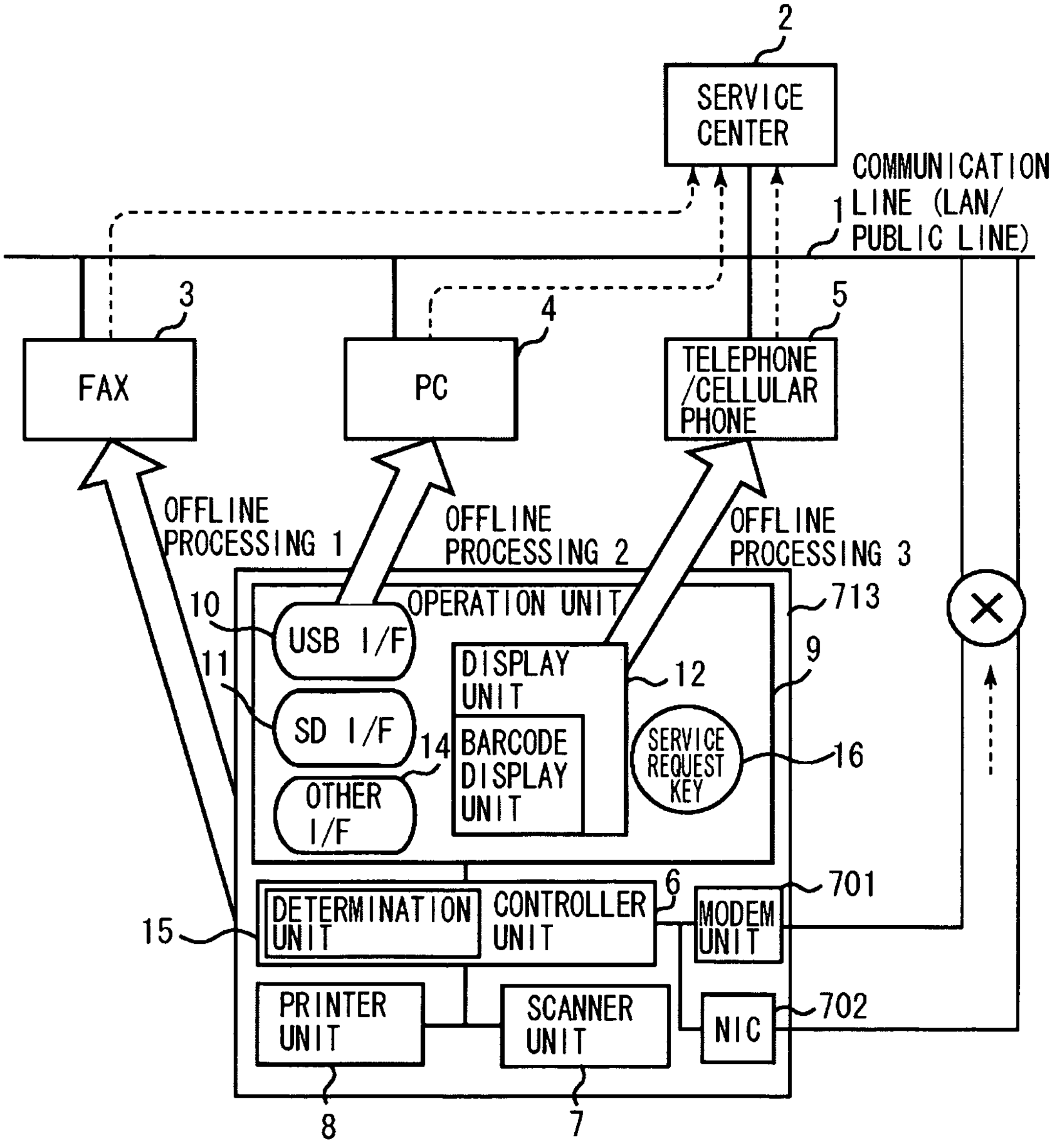
FIG. 18 illustrates an example of a configuration of a maintenance management system according to a second exemplary embodiment of the present invention.

FIG. 18 illustrates an example of the configuration of the maintenance management system according to the second exemplary embodiment of the present invention. An image forming apparatus 713 according to the second exemplary embodiment includes a modem unit 701 and a network unit (NIC: Network Interface Card) 702. The network unit 702 is connected to a LAN as the communication line 1 and is used for inputting/outputting information. The modem unit 701 is connected to a public line as the communication line 1 and is used for inputting/outputting image information. The modem unit 701 and the network unit 702 are connected to the controller unit 6.

If a connection to a communication line such as a network or a telephone line is disconnected, or if the modem unit 701 or the network unit 702 breaks down, the controller unit 6 determines whether the image forming apparatus 713 is in a state (e.g., offline state) incapable of notifying the service center 2 of the information. It is to be noted that the image forming apparatus 13 illustrated in FIG. 1 is in a state unconnectable to the communication line 1.

In such a state, even if the determination unit 15 in the controller unit 6 determines that the image forming apparatus 713 is in an abnormal state, the controller unit 6 may be unable to notify the service center 2 of the error. Thus, as is with the first exemplary embodiment, the controller unit 6 displays the notification devices to which the error information can be output so that the user can select an appropriate device. Since processes after the device is selected are similar to those of the first exemplary embodiment, their description is omitted.

According to the second exemplary embodiment, the image forming apparatus 713 and the service center 2 are normally in a state connectable via the communication line. In this state, if an abnormal situation occurs with the image forming apparatus 713, according to a control of the controller unit 6, the service center 2 may be automatically notified of the situation by a service call. Further, if the user determines that the image forming apparatus 713 is in an abnormal state and presses the service request key used for asking the service center 2 for repair, then the controller unit 6 detects that the service request key has been pressed, and can notify the service center 2 of the request.

Figure 19:
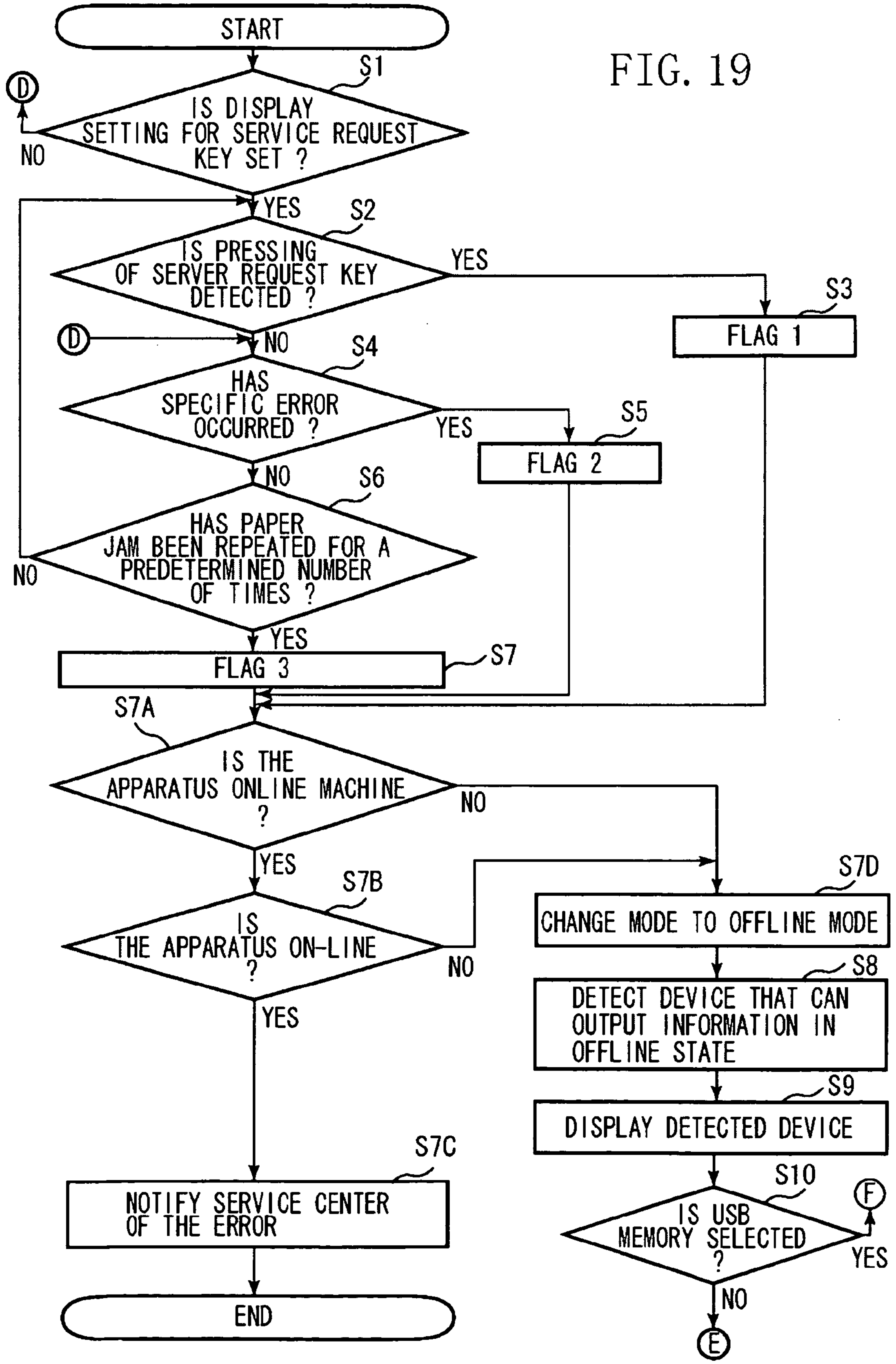
FIG. 19 is a flowchart illustrating an example of an operating procedure concerning maintenance management of the image forming apparatus according to the second exemplary embodiment of the present invention.
Figure 20:
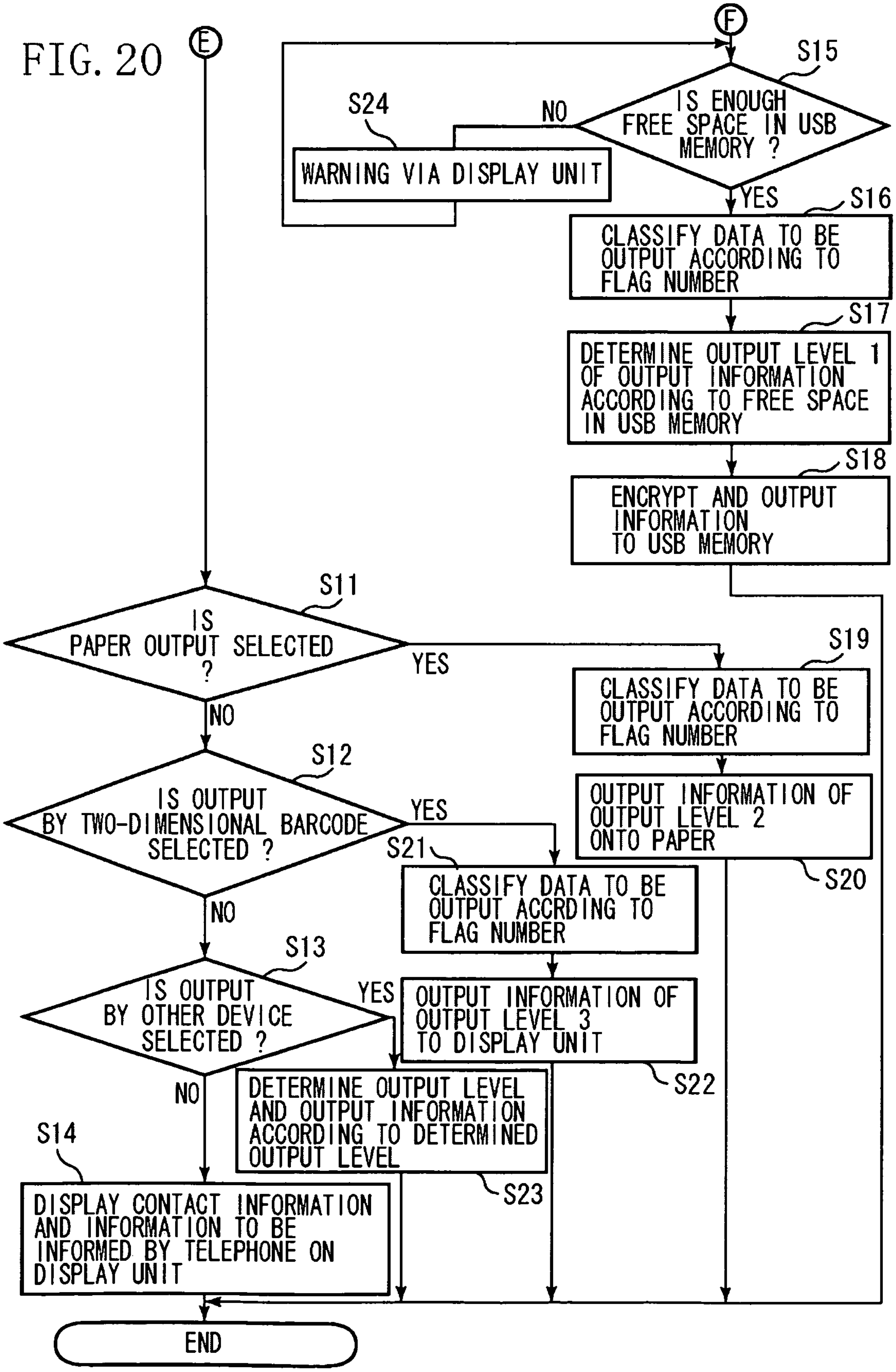
FIG. 20 is a flowchart illustrating an example of an operating procedure concerning maintenance management of the image forming apparatus continued from FIG. 19 according to the second exemplary embodiment of the present invention.

FIGS. 19 and 20 are flowcharts illustrating an operating procedure of maintenance management of the image forming apparatus 713 according to the second exemplary embodiment. The processing program may be stored in the ROM 403 in the controller unit 6 and executed by the CPU 401 in the controller unit 6. Processes similar to those in FIGS. 6 and 7 of the first exemplary embodiment are denoted by the same step number and a part of their description is omitted for simplification. Description is provided for steps not described in the first exemplary embodiment.

As described above, in step S1, if a service request key 16 provided on the operation unit 9 is pressed by the user, the controller unit 6 determines whether the setting is set to be in a state that allows notification to the service center 2 when the service request key 16 is pressed. If the setting is set to be in a state that allows notification to the service center when the service request key 16 is pressed (YES in step S1), processing proceeds to step S2. If the setting is not set to be in a state that allows notification to the service center when the service request key 16 is pressed (NO in step S1), processing proceeds to step S4. In step S2, if the pressing of the service request key 16 is detected (YES in step S2), then in step S3, the controller unit 6 sets a flag 1. The service request key 16 may be pressed by the user when the user determines that the image forming apparatus 713 is in an abnormal state and that the service center 2 should be notified of the state. More specifically, the service request key 16 may be pressed when the user notices one or more of an image defect, a specific paper jam, and frequent paper jams, and determines that the image forming apparatus is in a state different from the normal state. If the present of the service request key 16 is not detected (NO in step S2), processing proceeds to step S4.

In step S4, if the controller unit 6 determines that a specific error or an error that is to be notified to the service center 2 has occurred (YES in step S4), then in step S5, the controller unit 6 sets the flag 2. Processing then proceeds to step S7A. According to the present exemplary embodiment, an error may be determined to be specific if the error is detected while the image forming apparatus is in the image forming or non-image forming processes, and the determination unit 15 determines that the image forming apparatus is unable to recover automatically even if the power supply is turned off and on again, or if the determination unit 15 determines that the error is a serious error and that the operation is difficult to continue.

However, if the controller unit 6 determines that a specific error has not occurred (NO in step S4), processing proceeds to step S6. In step S6, the controller unit 6 determines whether a paper jam has occurred a predetermined number (i.e., a specified number) of times. Even if a paper jam occurs during the image forming processing, the paper jam may be corrected if normal paper jam processing is performed. Thus, the determination unit 15 may determine that the service center is not to be notified of the error. However, if a similar paper jam is repeated a predetermined number of times, the determination unit 15 may determine that the image forming apparatus is unable to recover automatically due to, for example, abrasion of a conveyance roller or failure of a sensor, even after jam processing is performed, and may determine that a replacement part is necessary. Thus, if a similar paper jam is repeated a predetermined number of times (YES in step S6), then the processing proceeds to step S7. If the paper jam has not been repeated for a predetermined number of times (NO in step S6), processing returns to step S2. In step S7, according to the determination of the determination unit 15, the controller unit 6 determines that the error is a paper jam that the service center 2 is to be notified of, and sets a flag 3.

In steps S7A, after one of the flags 1, 2, and 3 are set in one of steps S3, S5, and S7, the controller unit 6 determines whether the image forming apparatus 713 is an online machine. An online machine is an apparatus that includes, for example, at least one of the network unit 702 and the modem unit 701 (e.g., facsimile function), and is capable of sending information to the service center 2 via the communication line 1.

If the image forming apparatus 713 is an online machine (YES in step S7A), then the processing proceeds to step S7B.

In step S7B, the controller unit 6 determines whether the image forming apparatus 713, which is an online machine, is actually in an on-line state. For example, the image forming apparatus 713 will be unable to communicate if connection of the communication line is poor, or if the network unit 702 or the facsimile function has are in a state of failure. If the controller unit 6 determines that the image forming apparatus 713 is in an on-line state (YES in step S7B), then in step S7C, the controller unit 6 notifies the service center 2 of the error. Then, the processing ends.

On the other hand, in step S7A, if the image forming apparatus 713 is determined not to be an online machine (NO in step S7A), or in step S7B, if the image forming apparatus 713 is determined not to be in an online state (NO in step S7B), the processing proceeds to step S7D. In step S7D, the controller unit 6 enters into an offline mode. Since processes during and after step S8 when the controller unit 6 is in the offline mode are similar to those in FIGS. 6 and 7 of the first exemplary embodiment, the description will be omitted. Instep S7B, even though the image forming apparatus 713 is determined to be in an online state (YES in step S7B), the processing may also optionally proceed to step S7D.

As described above, embodiments of the present invention can be applied to an online image forming apparatus that is connectable to a communication line. Thus, even when the image forming apparatus is in an offline state unconnected to the communication line, the service engineer may be able to be accurately provided with information on a state of the image forming apparatus according to the environment of the user and/or the image forming apparatus. Further, since the user may have more choices of the notification methods, a more user-friendly environment can be realized. Additionally, when the image forming apparatus is connectable to the communication line, relatively prompt notification can be realized.

Aspects of the present invention can be applied to a system including a plurality of devices, or to an apparatus including a single device. For example, an image forming apparatus such as a multifunction peripheral (MFP) having print, copy, and scan functions, a printer, or a facsimile machine having print function, a scanner, a personal computer, or a cellular phone can constitute exemplary embodiments according to aspects of the present invention.

Further, a shape of each component of the above-described exemplary embodiments and their relative arrangement may be changed according to a configuration of the apparatus according to embodiments of the present invention or various conditions, and shall not to be construed as being limited to the above-described embodiments.

Furthermore, embodiments according to the present invention are not limited to an image forming apparatus employing an electrophotographic printing method, as described in the above-described embodiments, and image forming apparatuses employing various printing methods including for example one or more of ink jet, thermal transfer, thermal, electrostatic, and discharge breakdown, can also be applied to according to aspects of the present invention. Additionally, a print medium according to aspects of the present invention is not limited to a paper medium, and a medium such as at least one of an overhead projector (OHP) transparency film sheet, and thick print paper can also be used.

Aspects of the present invention can be achieved by supplying a computer-readable storage medium, in which one or more of computer-executable instructions and software program code configured to realize a function according to the above-described exemplary embodiments is stored, to a system or an apparatus, and reading out one or more of the computer-executable instructions and program code stored in the computer-readable storage medium by a computer (or CPU or MPU) of the system or the apparatus.

In this case, the computer-executable instructions and/or program code read out from the storage medium itself may realize functions according to aspects of the above-described exemplary embodiments, and the computer-readable storage medium which stores the computer-executable instructions and/or program code may also fall within the scope of the present invention.

A storage medium for supplying one or more of the computer-executable instructions and program may include, for example, at least one of a floppy disk, a hard disk, a magneto-optical disc, a compact disc read-only memory (CD-ROM), a compact disc recordable (CD-R), a compact disc rewritable (CD-RW), a digital versatile disc (DVD) (DVD-ROM, DVD-RAM, DVD-RW, DVD+RW), a magnetic tape, a non-volatile memory card, and a ROM. In addition, the program code and/or computer-executable instructions may also be downloaded via a network.

A function according to aspects of the above-described embodiments may be realized when the computer executes the computer-executable instructions and/or program code read out from the computer-readable storage medium. Additionally, an operating system (OS) or the like, which runs on a computer, can execute a part or whole of the actual processing based on the computer-executable instructions and/or program code, so that a function according to the above-described embodiments can be achieved.

Furthermore, one or more of the computer-executable instructions and the program code read out from the computer-readable storage medium may be written in a memory in a function expanding board inserted in a computer or a function expanding unit connected to a computer, and a CPU provided in the function expanding board or the function expanding unit may perform the whole or a part of the actual processing based on the computer-executable instructions and/or program to realize functions according to aspects of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-069969 filed Mar. 18, 2008, which is hereby incorporated by reference herein in its entirety.

What is claimed is:

1. An image forming apparatus comprising:

a determination unit configured to determine an abnormal state of the image forming apparatus;

a storage unit configured to store information indicating a state of the image forming apparatus;

a plurality of output units configured to output the stored information in different output methods;

a display unit configured to display information regarding each of the plurality of output units;

a selection unit configured to select an output unit designated by a user using the displayed information; and a connection state determination unit configured to determine whether the image forming apparatus is connectable to a communication line to be used for notification of the stored information to an external apparatus, wherein the selection unit selects the output unit in a case that the image forming apparatus is determined to be in an abnormal state by the determination unit and the image forming apparatus is determined as being unconnectable to the external apparatus by the connection state determination unit.

2. The image forming apparatus according to claim 1, further comprising a search unit configured to search for an available output unit from among the plurality of output units, wherein the display unit displays information regarding the output unit searched for by the search unit.

3. The image forming apparatus according to claim 1, further comprising a limiting unit configured to limit an amount of the information to be output from the storage unit according to a type of the selected output unit.

4. The image forming apparatus according to claim 3, wherein the amount of information to be output is limited to include at least one of information regarding software version information, configuration information of the image forming apparatus, jam information, error information, and log information indicating an operating procedure of the image forming apparatus, based on an amount of information that can be output by the selected output unit.

5. The image forming apparatus according to claim 4, wherein if the log information is included in the information to be output, a level of detail of the log information stored in the storage unit is controlled based on an amount of information that can be output from the selected output unit.

6. The image forming apparatus according to claim 5, wherein the level of detail of the log information is controlled so that if the amount of information that can be output from the selected output unit is larger than a predetermined value, log information having a higher level of detail is stored in the storage unit, and if the amount of information that can be output from the selected output unit is smaller than a predetermined value, log information having a lower level of detail, the level of which is lower than the higher level, is stored in the storage unit.

7. The image forming apparatus according to claim 1, further comprising an input unit configured to accept a specific operation from a user, wherein if the specific operation is accepted by the input unit, the determination unit determines the abnormal state of the image forming apparatus.

8. The image forming apparatus according to claim 7, wherein the input unit accepts an operation for requesting repair or service as the specific operation.

9. The image forming apparatus according to claim 1, wherein the plurality of output units include at least two of a memory output unit configured to output information to a removable memory, a barcode output unit configured to output information as a barcode, a paper output unit configured to output information on a sheet, a display output unit configured to output information on a display unit, and a personal computer output unit configured to output information to a personal computer.

10. The image forming apparatus according to claim 1, wherein the image forming apparatus is unconnected to a communication line used for notification of the stored information to an external apparatus.

11. The image forming apparatus according to claim 1, wherein the image forming apparatus provides the external apparatus with the stored information via the communication line if the image forming apparatus is determined to be in the abnormal state by the determination unit and determined as being connectable to the external apparatus by the connection state determination unit.

12. The image forming apparatus according to claim 1, further comprising a limiting unit configured to limit an amount of the information output by the selected output unit based on a content of the abnormal state determined by the determination unit.

13. The image forming apparatus according to claim 12, wherein if the abnormal state determined by the determination unit is an abnormal state concerning a paper jam, the information to be output includes a paper jam history.

14. The image forming apparatus according to claim 12, wherein if the abnormal state determined by the determination unit is an abnormal state concerning an error, the information to be output includes an error history.

15. A method for controlling an image forming apparatus comprising:

determining an abnormal state of the image forming apparatus;

storing information indicating a state of the image forming apparatus;

displaying information regarding each of a plurality of output units configured to output the stored information in different output methods;

selecting an output unit designated by a user using the displayed information; and determining whether the image forming apparatus is connectable to a communication line to be used for notification of the stored information to an external apparatus, wherein the output unit is selected in a case that the image forming apparatus is determined to be in an abnormal state and the image forming apparatus is determined as being unconnectable to the external apparatus.

16. A non-transitory computer-readable storage medium having computer-executable instructions stored therein for causing a computer to execute a method for controlling an image forming apparatus, the computer-readable storage medium comprising:

computer-executable instructions for determining an abnormal state of the image forming apparatus;

computer-executable instructions for storing information indicating a state of the image forming apparatus;

computer-executable instructions for displaying information regarding each of a plurality of output units configured to output the stored information by different output methods;

computer-executable instructions for selecting an output unit designated by a user using the displayed information; and computer-executable instructions for determining whether the image forming apparatus is connectable to a communication line to be used for notification of the stored information to an external apparatus, wherein the output unit is selected in a case that the image forming apparatus is determined to be in an abnormal state and the image forming apparatus is determined as being unconnectable to the external apparatus.

* * * * *